(12) United States Patent
Abe et al.

(10) Patent No.: US 9,258,825 B2
(45) Date of Patent: Feb. 9, 2016

(54) BASE STATION APPARATUS, MOBILE TERMINAL APPARATUS AND COMMUNICATION CONTROL METHOD

(75) Inventors: Tetsushi Abe, Tokyo (JP); Satoshi Nagata, Tokyo (JP); Mikio Iwamura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 149 days.

(21) Appl. No.: 13/985,355

(22) PCT Filed: Feb. 13, 2012

(86) PCT No.: PCT/JP2012/053292
§ 371 (c)(1),
(2), (4) Date: Sep. 3, 2013

(87) PCT Pub. No.: WO2012/111623
PCT Pub. Date: Aug. 23, 2012

(65) Prior Publication Data
US 2013/0336150 A1    Dec. 19, 2013

(30) Foreign Application Priority Data

Feb. 14, 2011 (JP) .............................. 2011-028534

(51) Int. Cl.
*H04W 72/08* (2009.01)
*H04L 5/00* (2006.01)
(Continued)

(52) U.S. Cl.
CPC ........... *H04W 72/085* (2013.01); *H04L 5/0023* (2013.01); *H04L 5/0048* (2013.01); *H04L 5/0053* (2013.01); *H04L 5/0062* (2013.01); *H04L 5/0098* (2013.01); *H04W 24/10* (2013.01); *H04L 25/0204* (2013.01)

(58) Field of Classification Search
CPC ...................................................... H04W 72/08
See application file for complete search history.

(56) References Cited

U.S. PATENT DOCUMENTS

| 8,576,822 B2 * | 11/2013 | Yoon et al. ...................... 370/342 |
| 2011/0039499 A1 * | 2/2011 | Zhang et al. ................ 455/67.11 |
| 2011/0170435 A1 * | 7/2011 | Kim et al. ...................... 370/252 |

(Continued)

OTHER PUBLICATIONS

International Search Report issued in PCT/JP2012/053292 mailed Apr. 10, 2012 (1 page).

(Continued)

*Primary Examiner* — Brandon Renner
*Assistant Examiner* — Manuel Rangel
(74) *Attorney, Agent, or Firm* — Osha Liang LLP

(57) ABSTRACT

The present invention makes it possible to transmit and receive CSI-RSs adequately even when the number of CSI-RSs increase following the increase of antennas. The present invention provides a base station apparatus (20) that transmits CSI-RSs to a mobile terminal apparatus (10A) which is capable of receiving CSI-RSs for channel state measurement from a plurality of antennas, and to a mobile terminal apparatus (10B) which is capable of receiving CSI-RSs from a smaller number of antennas than the mobile terminal apparatus, and this base station apparatus has a CSI-RS allocation section (211) which allocates CSI-RSs for the number of antennas which the mobile terminal apparatus (10A) supports, to radio resources, and a transmitting/receiving section which reports, to the mobile terminal apparatus (10A), the resources where the CSI-RSs are allocated, and which, upon reporting the resources where CSI-RSs are allocated, to the mobile terminal apparatus (10B), reports part of the resources as resources to be muted.

5 Claims, 13 Drawing Sheets

(51) Int. Cl.
*H04W 24/10* (2009.01)
*H04L 25/02* (2006.01)

(56) References Cited

U.S. PATENT DOCUMENTS

| | | | | |
|---|---|---|---|---|
| 2011/0244877 | A1* | 10/2011 | Farajidana et al. | 455/452.2 |
| 2012/0058791 | A1* | 3/2012 | Bhattad et al. | 455/509 |
| 2012/0208541 | A1* | 8/2012 | Luo et al. | 455/437 |
| 2012/0220327 | A1* | 8/2012 | Lee et al. | 455/509 |
| 2013/0223264 | A1* | 8/2013 | Miki et al. | 370/252 |

OTHER PUBLICATIONS

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN)"; Release 7; Sep. 2006 (57 pages).

3GPP TS 36.212 V9.3.0; "3rd Generation Partnership Project; Technical Specification Group Radio Access Network; Evolved Universal Terrestrial Radio Access (E-UTRA); Multiplexing and channel coding"; Release 9; Sep. 2010 (61 pages).

Japanese Office Action issued in Japanese Patent Application No. 2012-203110, mailing date Oct. 8, 2013, with English translation thereof (4 pages).

3GPP TSG-RAN WG1#63bis, R1-110517; "Views on UE Capabilities for Rel-10 DL MIMO;" CMCC; Dublin, Ireland; Jan. 17-21, 2011 (2 pages).

3GPP TSG RAN WG1 Meeting #62bis; R1-105132; "Proposal for Specification of PDSCH Muting;" Huawei, LG Electronics, Samsung, Panasonic, Intel, HiSilicon, New Postcom, CATR, Potevio, CMCC; Xi'an, China; Oct. 11-15, 2010 (6 pages).

Office Action in counterpart Japanese Patent Application No. JP2012-203110 issued Jan. 7, 2014 (4 pages).

Huawei et al; "Remaining details on CSI RS"; 3GPP TSG RAN WG1 Meeting #63, R1-105840; Jacksonville, USA; Nov. 15-19, 2010 (12 pages).

Qualcomm Incorporated; "Signaling and Configuration of CSI-RS"; 3GPP TSG-RAN WG1 #62, R1-104797; Madrid, Spain; Aug. 23-27, 2010 (7 pages).

Decision to Grant a Patent in corresponding Japanese application No. 2011-028534 dated Jul. 17, 2013 (4 pages).

Decision to Grant a Patent in corresponding Japanese Patent Application No. 2012-203110, which is a divisional application of Japanese Patent Application No. 2011-028534, mailed Mar. 25, 2014, with translation (4 pages).

* cited by examiner

BASE STATION APPARATUS, MOBILE TERMINAL APPARATUS AND COMMUNICATION CONTROL METHOD

TECHNICAL FIELD

The present invention relates to a base station apparatus, a mobile terminal apparatus and a communication control method in a next-generation mobile communication system.

BACKGROUND ART

In a UMTS (Universal Mobile Telecommunications System) network, for the purposes of improving spectral efficiency and improving the data rates, system features based on W-CDMA (Wideband Code Division Multiple Access) are maximized by adopting HSDPA (High Speed Downlink Packet Access) and HSUPA (High Speed Uplink Packet Access). For this UMTS network, for the purposes of further increasing high-speed data rates, providing low delay and so on, long-term evolution (LTE) has been under study (non-patent literature 1).

In the third-generation mobile communication system, it is possible to achieve a transmission rate of maximum approximately 2 Mbps on the downlink by using a fixed band of approximately 5 MHz. Meanwhile, in the LTE system, it is possible to achieve a transmission rate of about maximum 300 Mbps on the downlink and about 75 Mbps on the uplink by using a variable band which ranges from 1.4 MHz to 20 MHz. Furthermore, in the UMTS network, for the purpose of achieving further broadbandization and higher speed, successor systems of LTE have been under study (hereinafter referred to as, for example, "LTE-advanced" or "LTE-enhancement" (hereinafter "LTE-A")). Accordingly, in the future, it is expected that these multiple mobile communication systems will coexist, and configurations (base station apparatus, mobile terminal apparatus, etc.) that are capable of supporting these multiple systems will become necessary.

In the downlink of the LTE system (for example, Rel. 8), a CRS (Cell-specific Reference Signal) is defined. This CRS is used to demodulate user data, and, besides, used to measure downlink channel quality (CQI: Channel Quality Indicator) for scheduling and adaptive control, and furthermore used to measure an average downlink propagation path state for cell search and handover (mobility measurement). Meanwhile, in the downlink of a successor system of LTE (for example, Rel. 10), a CSI-RS (Channel State Information—Reference Signal) is under study for dedicated use of CSI (Channel State Information) measurement.

CITATION LIST

Non-Patent Literature

Non-Patent Literature 1: 3GPP, TR25.912 (V7.1.0), "Feasibility Study for Evolved UTRA and UTRAN," September 2006

SUMMARY OF INVENTION

Technical Problem

Now, a mobile terminal apparatus in such a system (for example, Rel. 10) is capable of MIMO (Multiple-Input Multiple-Output) transmission by a plurality of antennas. In MIMO transmission, CSI-RSs to match the number of antennas (Tx) in a base station apparatus are transmitted to a mobile terminal apparatus. In future systems, it is anticipated that MIMO transmission by even a larger number of antennas will be supported, and the number of reference signals such as CSI-RSs will increase.

The present invention has been made in view of the above, and it is therefore an object of the present invention to provide a base station apparatus, a mobile terminal apparatus and a communication control method, whereby it is possible to transmit and receive reference signals adequately, even when the number of reference signals increases following the increase of antennas.

Solution to Problem

The base station apparatus according to the present invention is a base station apparatus to transmit reference signals to a first mobile terminal apparatus which is capable of receiving reference signals for measuring a channel state from a plurality of antennas, and to a second mobile terminal apparatus which is capable of receiving the reference signals from a smaller number of antennas than the first mobile terminal apparatus, and this base station apparatus includes: a reference signal allocation section that allocates at least the reference signals for the number of antennas which the first mobile terminal apparatus supports, to reference signal resources which are defined for transmission of the reference signals and which can be muted; and a reference signal reporting section that, to the first mobile terminal apparatus, reports resources where the reference signals are allocated, and that, to the second mobile terminal apparatus, when reporting the resources where the reference signals are allocated, reports part of the resources as resources to be muted.

Advantageous Effects of Invention

According to the present invention, it is possible to report reference signals to the first mobile terminal apparatus that is capable of receiving reference signals from a large number of antennas and to a second mobile terminal apparatus that is capable of receiving reference signals from a small number of antennas than the first mobile terminal apparatus. Also, the first mobile terminal apparatus is able to receive reference signals from a plurality of antennas of a base station apparatus and estimate the channel state. The second mobile terminal apparatus is able to receive reference signals from a plurality of antennas of the base station apparatus, and, disregarding the reference signals of resources reported as resources to be muted, measure the channel state from part of the reference signals. Consequently, the second mobile terminal apparatus is able to measure reference signals without being influenced by the increase of the number of antennas in the base station apparatus.

DESCRIPTION OF EMBODIMENTS

First, the CSI-RS, which is one of the reference signals adopted in a successor system of LTE (for example, Rel. 10), will be described with reference to FIG. 1. The CSI-RS is a reference signal to be used in CSI measurement of CQIs (Channel Quality Indicators), PMIs (Precoding Matrix Indicators), RIs (Rank Indicators) and so on, as the channel state. Unlike CRSs that are allocated to all subframes, CSI-RSs are allocated in a predetermined cycle, for example, in a ten-subframe cycle. Furthermore, a CSI-RS is specified by parameters such as position, sequence and transmission power. The position of a CSI-RS includes subframe offset, cycle and subcarrier-symbol offset (index).

In one resource block defined in LTE, CSI-RSs are allocated not to overlap control signals such as the PDCCH (Physical Downlink Control Channel) and so on, user data such as the PDSCH (Physical Downlink Shared Channel) and so on, and other reference signals such as the CRS (Cell-specific Reference Signal), the DM-RS (Demodulation-Reference Signal) and so on. One resource block is formed with twelve subcarriers that are consecutive in the frequency direction and fourteen symbols that are consecutive in the time axis direction. From the perspective of suppressing PAPR, resources that can transmit CSI-RSs are allocated two resource elements that neighbor each other in the time axis direction, as a set.

In the CSI-RS configurations shown in FIG. 1, forty resource elements are defined as CSI-RS resources (reference signal resources). In these forty resource elements, CSI-RS patterns are set in accordance with the number of CSI-RS ports (the number of antennas). In each CSI-RS pattern, for every one CSI-RS port, one resource element is set for the CSI-RS. When the number of CSI-RS ports is two, CSI-RSs are allocated to two resource elements, among forty resource elements. Consequently, in FIG. 1A, twenty CSI-RS patterns, designated by indices #0-#19 (CSI configurations=0-19), are set. Here, for ease of explanation, the same index is assigned to the resource elements constituting one pattern.

Figure 1A:
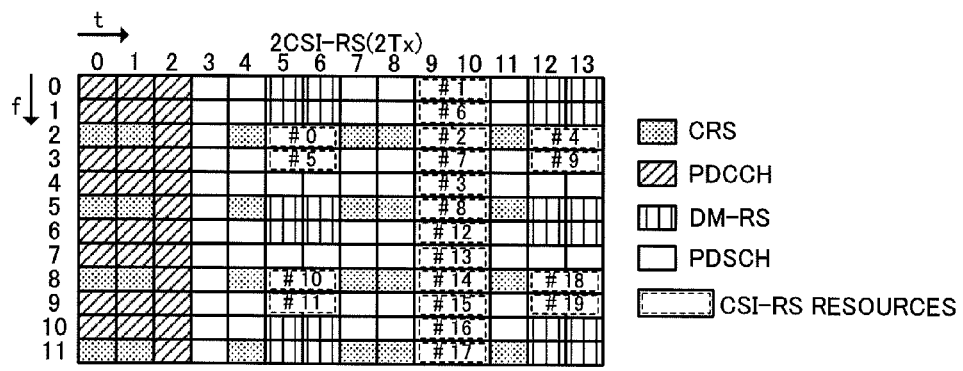
FIG. 1 provides diagrams to explain CSI-RS allocation patterns in resource blocks.
Figure 1B:
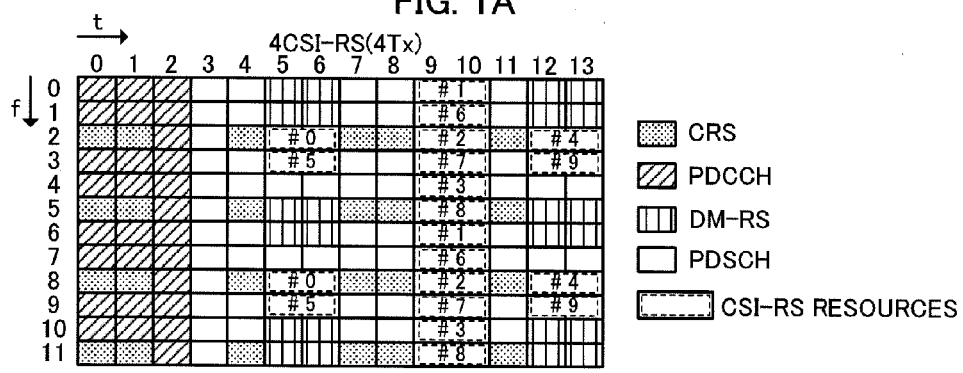
Figure 1C:
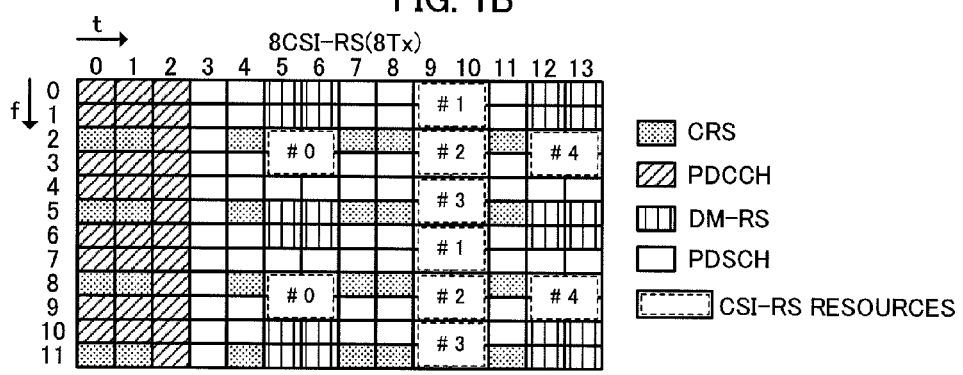

When the number of CSI-RS ports is four, CSI-RSs are allocated to four resource elements, among forty resource elements. Consequently, in FIG. 1B, ten patterns of CSI-RS patterns, designated by indices #0-#9 (CSI configurations=0-9), are set. When the number of CSI-RS ports is eight, CSI-RSs are allocated to eight resource elements, among forty resource elements. Consequently, as shown in FIG. 1C, five patterns of CSI-RS patterns, designated by indices #0-#4 (CSI configurations=0-4), are set. Note that, in the CSI-RS patterns, user data is allocated to the resource elements where CSI-RSs are not allocated.

Figure 1D:
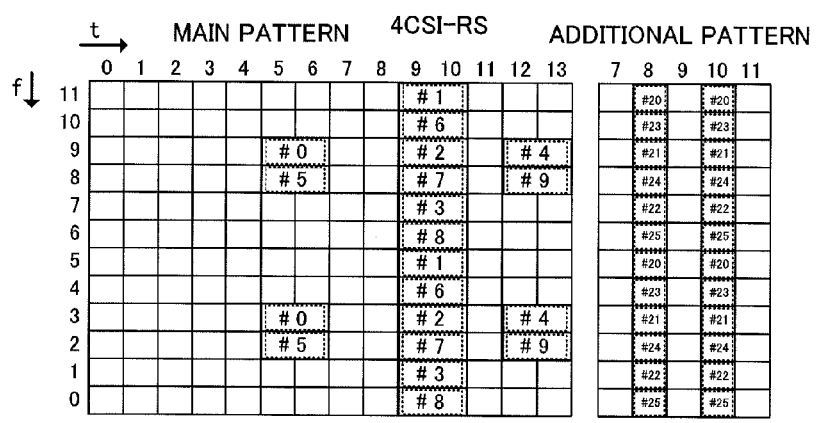

Then, with the CSI-RSs, a different CSI-RS pattern (CSI configuration) is selected for every cell, thereby preventing interference between cells. Also, the CSI-RS patterns may be a pattern to which TDD patterns are added as an FDD option as shown in FIG. 1D, besides the FDD normal patterns shown in FIG. 1A to FIG. 1C. Furthermore, extended patterns (not shown), which enhance the FDD normal patterns, may be used as well. In the following description, examples of FDD normal patterns will be described for ease of explanation.

Figure 2A:
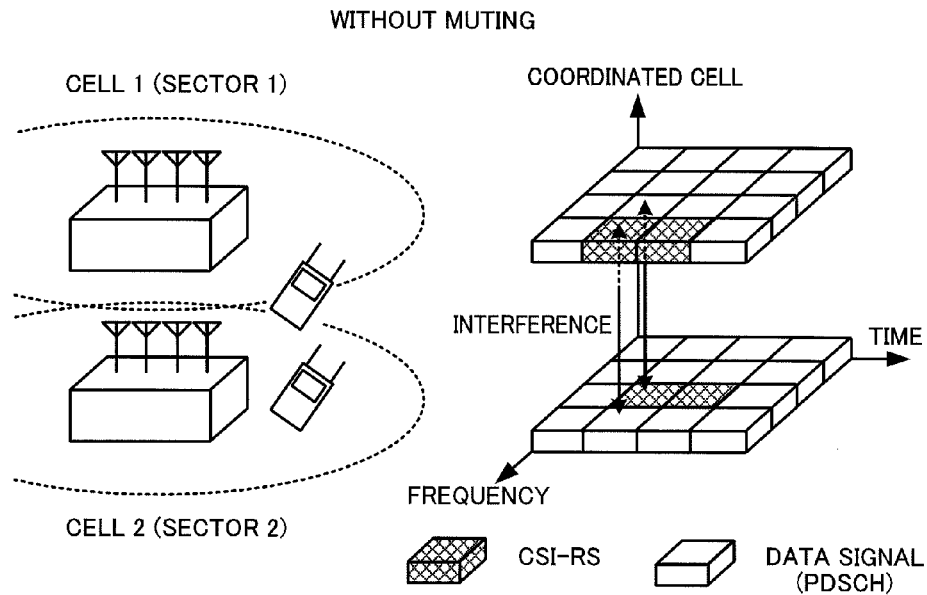
FIG. 2 provides diagrams to explain muting in CQI measurement using CSI-RSs.

Now, in CSI measurement using CSI-RSs, cases might occur where the accuracy of measurement is damaged by data interference from neighboring cells. For example, as shown in FIG. 2A, user data is allocated to a downlink resource block of cell C1 in a way to meet a CSI-RS of its neighboring cell C2. Also, user data is allocated to a downlink resource block of cell C2 in a way to meet a CSI-RS of its neighboring cell C1. Such user data constitutes interference components against CSI-RSs in each cell, and becomes a factor to damage the accuracy of CSI measurement in a mobile terminal apparatus that is located in a border between cell C1 and cell C2.

Figure 2B:
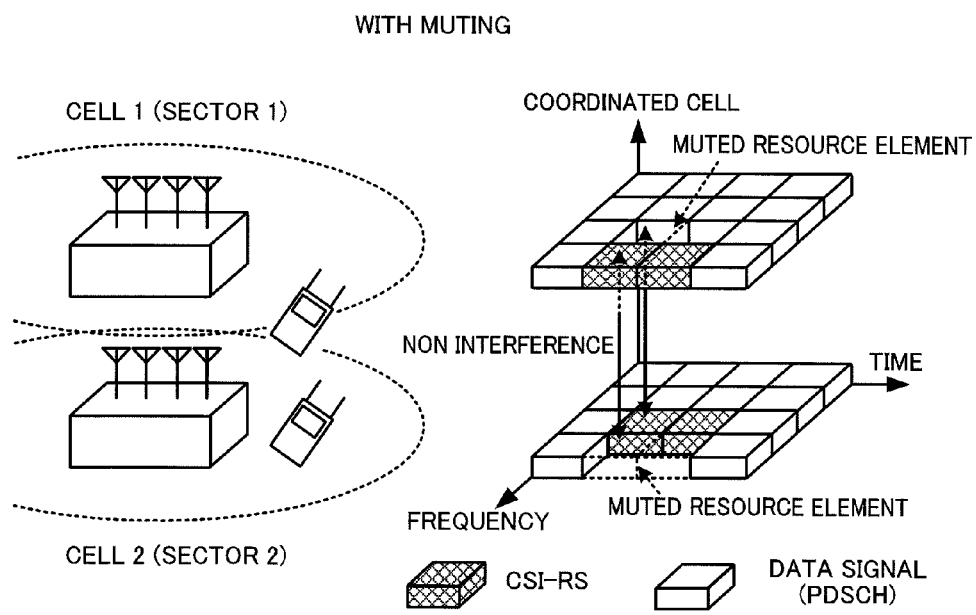

To improve the deterioration of the accuracy of CSI measurement due to the positions where user data is allocated, muting is under study. In muting, as shown in FIG. 2B, user data is not allocated to the resources corresponding to the CSI-RSs of neighboring cells. Downlink resource blocks of cell C1 are muted in accordance with the CSI-RSs of cell C2. Also, downlink resource blocks of cell C2 are muted in accordance with the CSI-RSs of cell C1.

By means of this configuration, the accuracy of CSI measurement in a mobile terminal apparatus is improved by eliminating interference components against CSI-RSs due to user data of neighboring cells. When muting is mutually applied between neighboring cells, the data channel of the subject cell is not transmitted for the neighboring cell, and therefore it is necessary to report the positions of muting resources to the mobile terminal apparatus. This is because rate matching is performed in the base station apparatus to avoid the resources to be muted, and therefore the mobile terminal apparatus has to identify the resources to be muted and perform de-rate matching. If the mobile terminal apparatus fails to identify the resources to be muted, the demodulation process is applied to the resources to be muted as well, and therefore the throughput of the demodulation process and the accuracy of demodulation are deteriorated.

Note that the resources to be muted may be defined as resources where no data is allocated, or may be defined as resources where data is allocated to an extent where interference is not given against the CSI-RSs of neighboring cells. Furthermore, resources that are muted may be defined as resources to be transmitted by transmission power not to give interference against the CSI-RSs of neighboring cells.

When a base station apparatus reports muting to a mobile terminal apparatus, the base station apparatus performs the reporting using CSI-RS patterns. In this case, muting may be reported in a bitmap format, in which the indices (CSI configurations) by which the CSI-RS patterns are numbered, and whether or not muting is applied, are associated on a one-by-one basis. Also, CSI-RS patterns of varying numbers of CSI-RS ports may be used reporting of muting and reporting of CSI-RSs.

Figure 3:
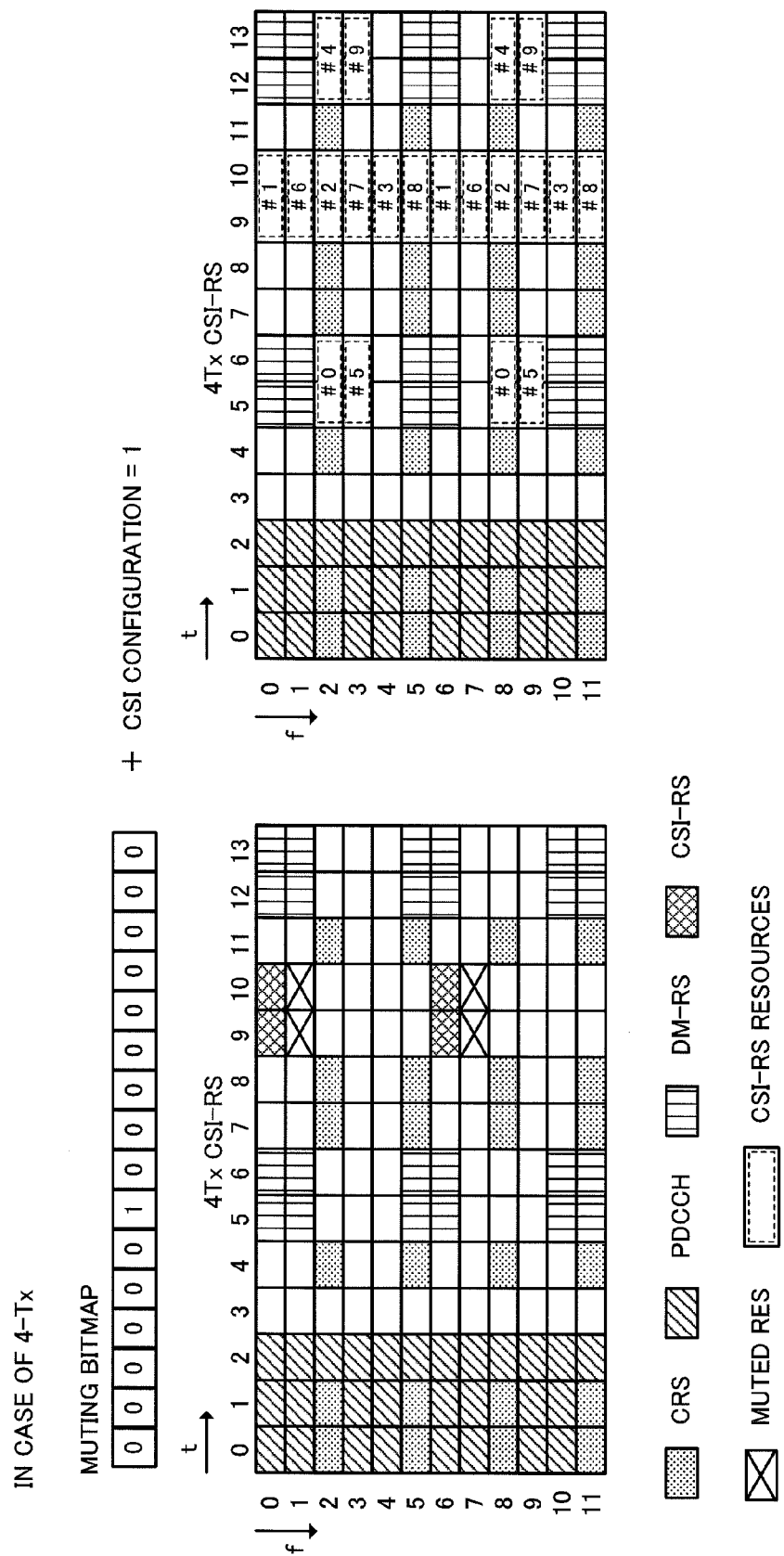
FIG. 3 is a diagram to show an example of a muting reporting method.

FIG. 3 shows an example of reporting muting to a mobile terminal apparatus that supports MIMO transmission of four transmission ports (Tx). As shown in FIG. 3, muting is set in the CSI-RS resources designated by index #6 (CSI configuration=6). In this case, 16 bit bitmap information [0100001000000000] is reported in association with the indices [#0-#9, #20-#25] (CSI configurations=0-9 and 20-25), where TDD additional patterns are added to the FDD normal patterns shown in FIG. 1D. In the bitmap information, "1" is set in the resources to be muted, and "0" is set in the resources that are not muted. Also, besides the bitmap information, the base station apparatus reports the transmission period (duty cycle) and subframe offset, to a mobile terminal apparatus.

Also, to the mobile terminal apparatus supporting 4-Tx MIMO, the base station apparatus reports CSI-RSs using the CSI-RS pattern to be applied when the number of CSI-RS ports is four. Here, CSI-RSs are allocated to the CSI-RS resources designated by index #1 (CSI configuration=1) in FIG. 1B. In addition to muting information, the base station apparatus reports the resources where CSI-RSs are allocated, to the mobile terminal apparatus.

Now, a mobile terminal apparatus of a successor system of LTE (for example, Rel. 10 and later versions) supports 2-Tx MIMO transmission, 4-Tx MIMO transmission and 8-Tx MIMO transmission. However, there is a possibility that 8-Tx MIMO transmission is used on a selective basis with respect to a mobile terminal apparatus. In this case, when the operation of the successor system starts, there is a possibility that the mobile terminal apparatus supports 2-Tx MIMO transmission and 4-Tx MIMO transmission but does not support 8-Tx MIMO transmission. Consequently, when the base station apparatus, which supported 4-Tx MIMO transmission at the start of the operation of the successor system, is upgraded for 8-Tx MIMO transmission, communication with the mobile terminal apparatus that does not support 8-Tx MIMO transmission becomes a problem.

Figure 4:
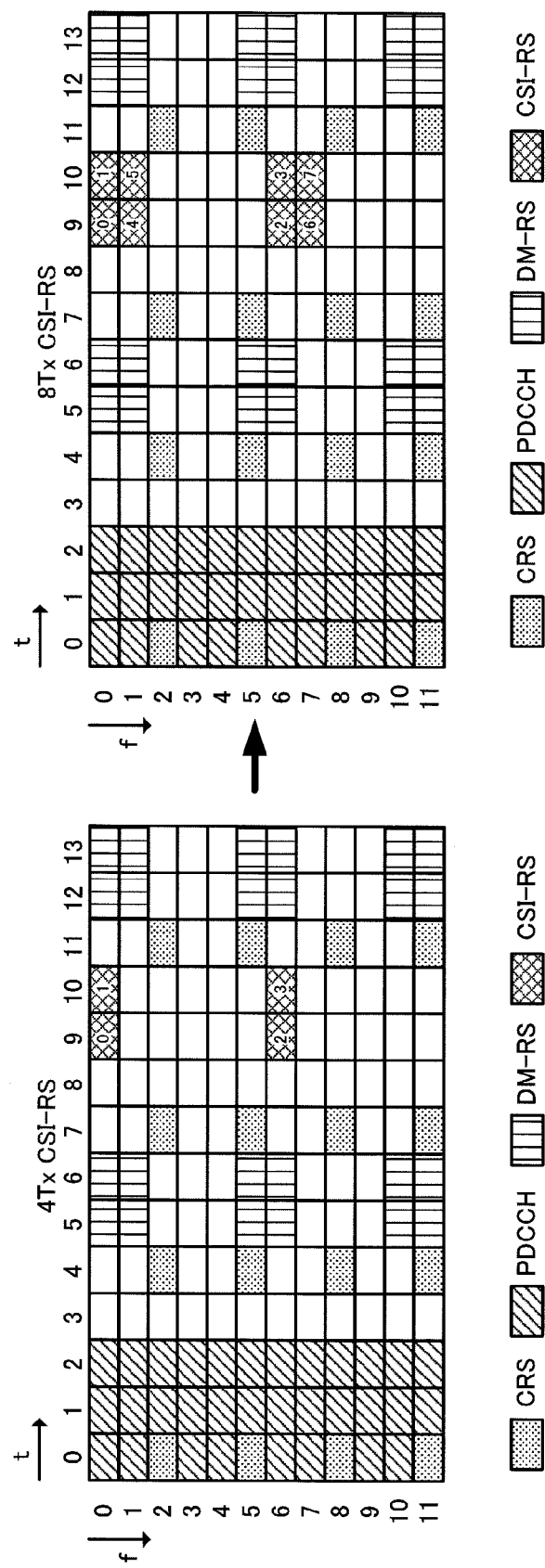
FIG. 4 is a diagram to show an example of a CSI-RS allocation configuration where a base station apparatus is changed from 4-Tx MIMO transmission to 8-Tx MIMO transmission.

Signaling is different between a mobile terminal apparatus that supports 4-Tx MIMO transmission (hereinafter referred to as "4-Tx mobile terminal apparatus") and a mobile terminal apparatus that supports 8-Tx MIMO transmission (hereinafter referred to as "8-Tx mobile terminal apparatus"). Consequently, there is a threat that the 4-Tx mobile terminal apparatus, which does not support signaling for 8-Tx, is unable to connect to the base station apparatus. Also, as shown in FIG. 4, when the base station apparatus is upgraded from 4-Tx MIMO transmission to 8-Tx MIMO transmission, the number of CSI-RS ports increases from four to eight. Consequently, even when the 4-Tx mobile terminal apparatus is able to connect to the base station apparatus for 8-Tx MIMO transmission, the 4-Tx mobile terminal apparatus is still unable to identify the increased CSI-RSs, and this becomes interference upon demodulation of user data and damages the reception characteristics significantly.

For example, in the example of FIG. 4, when the base station apparatus is upgraded from 4-Tx MIMO transmission to 8-Tx MIMO transmission, in addition to the CSI-RSs designated by "0-3," the CSI-RSs designated by "4-7" are allocated to the CSI-RS resources. Note that "0-7" in FIG. 4 represent the CSI-RS port numbers. Although the base station apparatus can report position information of the CSI-RSs designated as "0-7" to the 8-Tx mobile terminal apparatus, the base station apparatus cannot notify the CSI-RSs designated as "4-7" to the 4-Tx mobile terminal apparatus.

The present inventors have arrived at the present invention in order to solve this problem. That is to say, a gist of the present invention is that, to a new mobile terminal apparatus (for example, an 8-Tx mobile terminal apparatus), resources where CSI-RSs for the number of antennas are reported, and, to an legacy mobile terminal apparatus (for example, a 4-Tx mobile terminal apparatus), resources where CSI-RSs, not including the increase by muting, are allocated are reported. By this means, even when the base station apparatus is upgraded from 4-Tx MIMO transmission to 8-Tx MIMO transmission, the 4-Tx mobile terminal apparatus, which does not support 8-Tx MIMO transmission, is able to receive CSI-RSs adequately.

Now, the method of reporting CSI-RS position information according to the present embodiment will be described. FIG. 5 provides diagrams to show examples of a method of reporting CSI-RS position information. Note that, in the following description, a 4-Tx mobile terminal apparatus and an 8-Tx mobile terminal apparatus are located in the same cell. Also, although, in the following description, a configuration will be described as an example in which a base station apparatus is upgraded from 4-Tx MIMO transmission to 8-Tx MIMO transmission, other appropriate changes are equally possible. For example, a configuration may be possible in which the base station apparatus is upgraded from 2-Tx MIMO transmission to 8-Tx MIMO transmission.

Figure 5A:
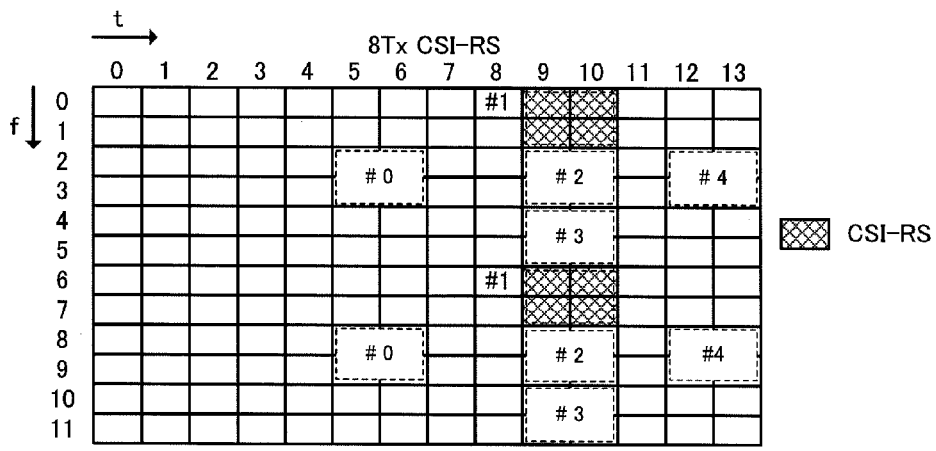
FIG. 5 provides diagrams to show examples of a method of reporting CSI-RS position information.

FIG. 5A shows an example of CSI-RS allocation for an 8-Tx mobile terminal apparatus. Here, in one resource block, forty resource elements are defined as CSI-RS resources. Also, one resource element is allocated for a CSI-RS for every one antenna (transmission port). Reporting to the 8-Tx mobile terminal apparatus is made using the CSI-RS pattern to be applied when the number of CSI-RS ports=8 (see FIG. 1C). Here, CSI-RS is allocated to the resources designated by index #1 (CSI configuration=1).

Note that, although, with the present embodiment, one CSI-RS is allocated for every one antenna in one resource block, it is equally possible to allocate a plurality of CSI-RSs for every one antenna. Also, CSI-RSs are allocated to avoid the CSI-RSs of neighboring cells, in order to reduce the inter-cell interference of the CSI-RSs. In this case, CSI-RS position information between cells may be defined in advance between neighboring base station apparatuses or may be changed dynamically between neighboring base station apparatuses.

Figure 5B:
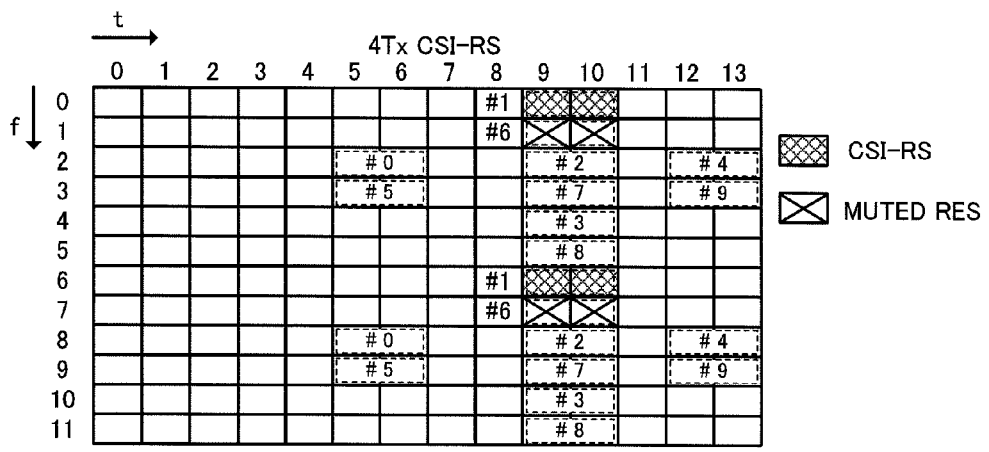

Meanwhile, as shown in FIG. 5B, a 4-Tx mobile terminal apparatus is able to receive four CSI-RSs in one resource block, in order to support 4-Tx MIMO transmission. Consequently, the 4-Tx mobile terminal apparatus cannot receive all the CSI-RSs allocated in a resource block. So, the base station apparatus reports the resources where the additional CSI-RSs are allocated, as resources to be muted, to the 4-Tx mobile terminal apparatus. The resources to be muted are reported using the CSI-RS pattern shown in FIG. 1D. Here, the resources designated by index #6 (CSI configuration=6) are reported as muted resources.

These resources are in fact allocated CSI-RSs, but nevertheless are recognized as resources to be muted, by the 4-Tx mobile terminal apparatus. Consequently, the 4-Tx mobile terminal apparatus disregards the CSI-RSs allocated to the resources reported as resources to be muted, and receives only the CSI-RSs allocated to the resources designated by index #1 (CSI configuration=1). Also, upon demodulation of user data, the 4-Tx mobile terminal apparatus eliminates the CSI-RSs of the resources recognized as resources to be muted, and therefore the accuracy and throughput of user data demodulation do not decrease.

Note that, with the present configuration, it is possible to notify CSI-RS position information from the base station apparatus to mobile terminal apparatuses by the first reporting method and second reporting method. The first reporting method is a method of reporting CSI-RS position information from the base station apparatus to 4-Tx and 8-Tx mobile terminal apparatuses individually. The second reporting method is a method of reporting CSI-RS position information from the base station apparatus to 4-Tx and 8-Tx mobile terminal apparatus together.

Figure 5C:
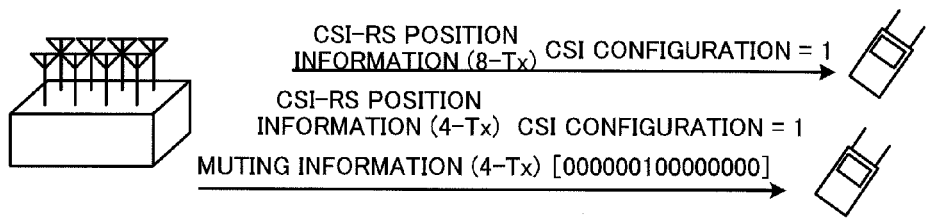

As shown in FIG. 5C, with the first reporting method, the base station apparatus reports CSI-RS position information to an 8-Tx mobile terminal apparatus individually by a CSI-RS pattern for 8-Tx. Furthermore, the base station apparatus reports CSI-RS position information to a 4-Tx mobile terminal apparatus individually by a CSI-RS pattern for 4-Tx, and also reports muting information, individually, instead of position information for the additional CSI-RSs.

For example, the base station apparatus may notify the resources where CSI-RSs are arranged, to the 4-Tx and 8-Tx mobile terminal apparatuses separately by CSI configuration information which represents CSI-RS patterns. As shown in FIG. 5A, the base station apparatus uses five patterns of CSI configurations to report CSI-RS position information to the 8-Tx mobile terminal apparatus. The base station apparatus reports CSI configuration=1, which represents index #1, as CSI-RS position information. As shown in FIG. 5B, the base station apparatus uses ten patterns of CSI configurations to report CSI-RS position information to the 4-Tx mobile terminal apparatus. The base station apparatus reports CSI configuration=1, which represents index #1, as CSI-RS position information, and also reports muting information.

In this case, the base station apparatus may report muting information to the 4-Tx mobile terminal apparatus, individually, in the above-described bitmap format. The base station apparatus notifies sixteen-bit bitmap information [0000001000000000], as muting information, in association with the indices [#0-#9 and #20-#25] (CSI configurations=0-9 and 20-25), where additional patterns are added to normal patterns. In the bitmap information, "1" is set in the resources to be muted, and "0" is set in the resources not to be muted. Note that, in the bitmap information, it is equally possible to set "0" in muting resources and set "1" in resources that are not muted. Also, although the bitmap information is formed with 16 bits, it is equally possible to form the bitmap information with 10 bits, which do not include the additional patterns.

Figure 5D:
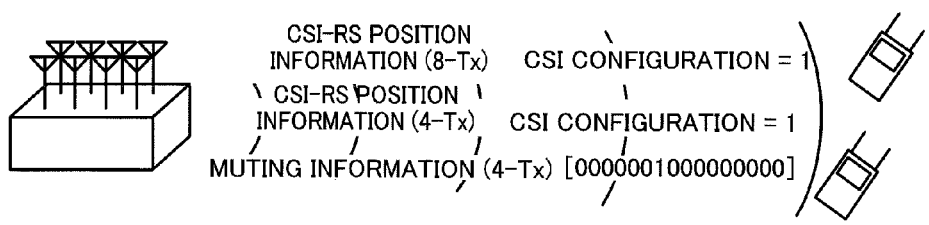

As shown in FIG. 5D, with the second reporting method, the base station apparatus concurrently reports CSI-RS position information to 4-Tx and 8-Tx mobile terminal apparatuses, by the CSI-RS patterns for 4-Tx and 8-Tx. Also, the base station apparatus reports 4-Tx muting information together. In this case, the 8-Tx mobile terminal apparatus disregards the report for 4-Tx and acquires the 8-Tx CSI-RS position information. Also, the 4-Tx mobile terminal apparatus disregards the report for 8-Tx and acquires the 4-Tx CSI-RS position information and muting information.

For example, the base station apparatus may concurrently report the resources where CSI-RSs are arranged to the 4-Tx and 8-Tx mobile terminal apparatuses, by CSI configuration information, which represents CSI-RS patterns. The base station apparatus reports CSI configuration=1 (see FIG. 5A), which represents index #1, to the 8-Tx mobile terminal apparatus, and also reports CSI configuration=1 (see FIG. 5B), which represents index #1, to the 4-Tx mobile terminal apparatus. Also, the base station apparatus may report muting information to the 4-Tx and 8-Tx mobile terminal apparatus together, in the above-described bitmap format. In this case, the base station apparatus notifies 16-bit bitmap information [0000001000000000] as muting information. This muting information for 4-Tx is disregarded in the 8-Tx mobile terminal apparatus.

Also, the base station apparatus may notify position information of all CSI-RSs to the 4-Tx mobile terminal apparatus by CSI-RS pattern for the number of CSI-RS ports=8. That is to say, by making reporting to make the 4-Tx mobile terminal apparatus use the CSI-RS subset for the 8-Tx mobile terminal apparatus, it is possible to reduce the amount of CSI-RS position information signaling. In this case, the base station apparatus reports muting information of part of the resources to the 4-Tx mobile terminal apparatus. Note that the base station apparatus may as well be configured not to report muting information to the 4-Tx mobile terminal apparatus. For example, resources in which CSI-RSs can be received and resources to be recognized as resources to be muted are set in advance for the 4-Tx mobile terminal apparatus. By this means, the 4-Tx mobile terminal apparatus is able to, for example, receive the CSI-RSs from the first to fourth antennas (CSI-RS port numbers) and disregard the CSI-RSs from the fifth to eighth antennas (CSI-RS port numbers). Consequently, it is possible to reduce the amount of signaling of muting information.

Next, other examples of a method of reporting CSI-RS position information will be described with reference to FIG. 6. FIG. 6 provides diagrams to show other examples of a method of reporting CSI-RS position information. Note that FIG. 6 shows configurations in which CSI-RSs for a 4-Tx mobile terminal apparatus and CSI-RSs for an 8-Tx mobile terminal apparatus are allocated to different resources.

Figure 6A:
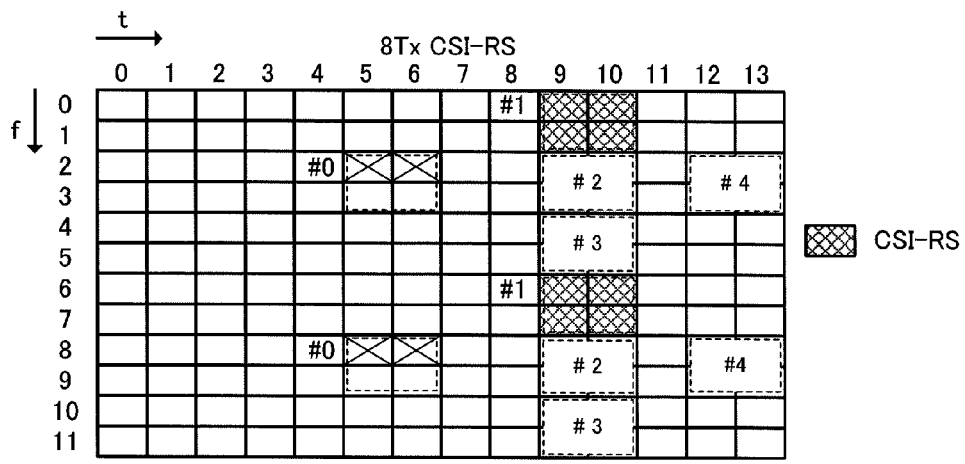
FIG. 6 provides diagrams to show other example of a method of reporting CSI-RS position information.

FIG. 6A shows an example of CSI-RS allocation with respect to 8-Tx mobile terminal apparatus. Here, in one resource block, forty resource elements are defined as CSI-RS resources. The 8-Tx mobile terminal apparatus is capable of receiving eight CSI-RSs in one resource block. Here, the resources designated by index #1 (CSI configuration=1) are reported as CSI-RS position information. However, the 8-Tx mobile terminal apparatus is unable to receive the CSI-RSs for the 4-Tx mobile terminal apparatus. Consequently, to the 8-Tx mobile terminal apparatus, the base station apparatus reports resource for CSI-RS 4-Tx mobile terminal apparatus as resources to be muted. The resources to be muted are reported using the CSI-RS pattern shown in FIG. 1D. Here, resources indicated by index #0 (CSI configuration=0) are reported as muted resources.

These resources are in fact allocated CSI-RSs, but nevertheless are recognized as resources to be muted, by the 8-Tx mobile terminal apparatus. Consequently, the 8-Tx mobile terminal apparatus disregards the CSI-RSs of the resources reported as resources to be muted, and receives only the CSI-RSs of the resources designated by index #1 (CSI configuration=1). Also, upon demodulation of user data, the 8-Tx mobile terminal apparatus disregards the CSI-RSs of the resources recognized as muting resources, and therefore the accuracy and throughput of user data demodulation do not decrease.

Figure 6B:
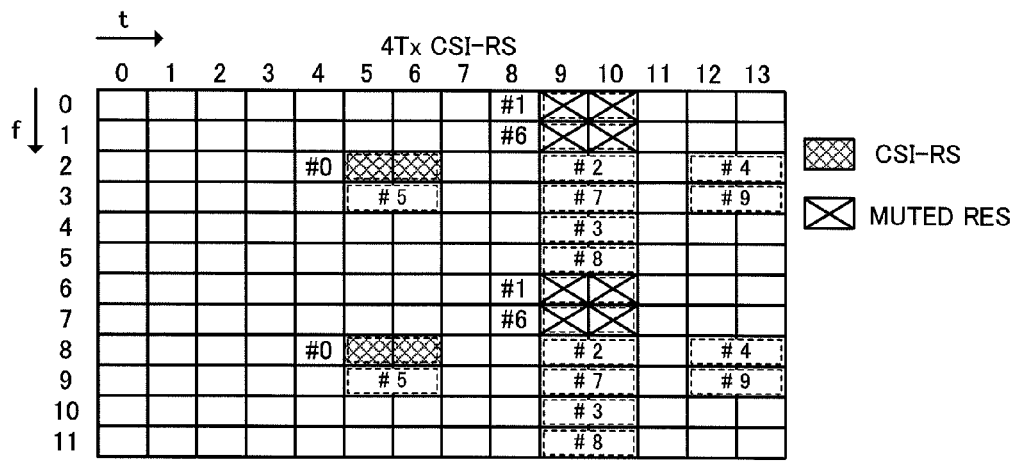

Meanwhile, as shown in FIG. 6B, the 4-Tx mobile terminal apparatus is capable of receiving four CSI-RSs in one resource block. Here, the resources designated by index #0 (CSI configuration=0) are reported as CSI-RS position information. However, the 4-Tx mobile terminal apparatus is unable to receive the CSI-RSs for the 8-Tx mobile terminal apparatus. Consequently, the base station apparatus reports the resource of the CSI-RSs for the 8-Tx mobile terminal apparatus to the 4-Tx mobile terminal apparatus as resources to be muted. The resources to be muted are reported using the CSI-RS pattern shown in FIG. 1D. Here, the resources designated by indices #1 and #6 (CSI configurations=1 and 6) are reported as muted resources.

These resources are in fact allocated CSI-RSs, but nevertheless are recognized as resources to be muted, by the 4-Tx mobile terminal apparatus. Consequently, the 4-Tx mobile terminal apparatus disregards the CSI-RSs of the resources reported as resources to be muted, and receives only the CSI-RSs of the resources designated by index #0 (CSI configuration=0). Also, upon demodulation of user data, the 4-Tx mobile terminal apparatus disregards the CSI-RSs of the resources recognized as resources to be muted, and therefore the accuracy and throughput of user data demodulation do not decrease.

Note that, with the present embodiment, too, it is possible to report CSI-RS position information from the base station apparatus to the mobile terminal apparatuses by the first reporting method and second reporting method. The first reporting method is a method of reporting CSI-RS position information from the base station apparatus to the 4-Tx and 8-Tx mobile terminal apparatuses separately. The second reporting method is a method of reporting CSI-RS position information from the base station apparatus to the 4-Tx and 8-Tx mobile terminal apparatuses together.

Figure 6C:
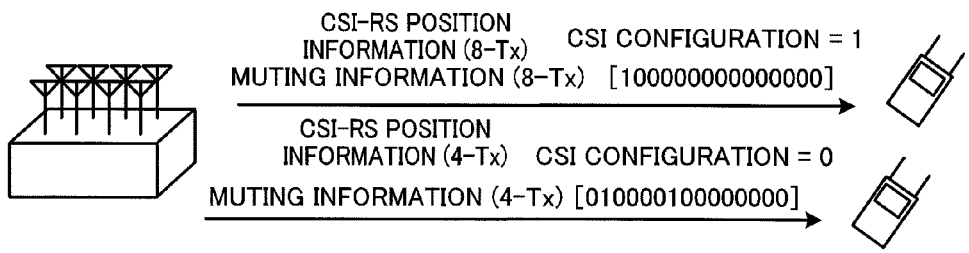

As shown in FIG. 6C, with the first reporting method, the base station apparatus reports CSI-RS position information to the 8-Tx mobile terminal apparatus individually by the CSI-RS pattern for 8-Tx, and also reports muting information individually. Furthermore, the base station apparatus reports CSI-RS position information to the 4-Tx mobile terminal apparatus individually by the CSI-RS pattern for 4-Tx, and also reports muting information individually.

For example, the base station apparatus may individually report the resources where CSI-RSs are arranged, to the 4-Tx and 8-Tx mobile terminal apparatuses, by CSI configuration information, which represents CSI-RS patterns. As shown in FIG. 6A, the base station apparatus reports CSI configuration=1, which represents index #1, to the 8-Tx mobile terminal apparatus. As shown in FIG. 6B, the base station apparatus reports CSI configuration=0, which represents index #0, to the 4-Tx mobile terminal apparatus.

Also, the base station apparatus may report muting information to the 4-Tx and 8-Tx mobile terminal apparatuses, individually, in the above-described bitmap format. The base station apparatus reports 16-bit bitmap information [1000000000000000] to the 8-Tx mobile terminal apparatus. Also, the base station apparatus reports 16-bit bitmap information [0100001000000000] to the 4-Tx mobile terminal apparatus.

Figure 6D:
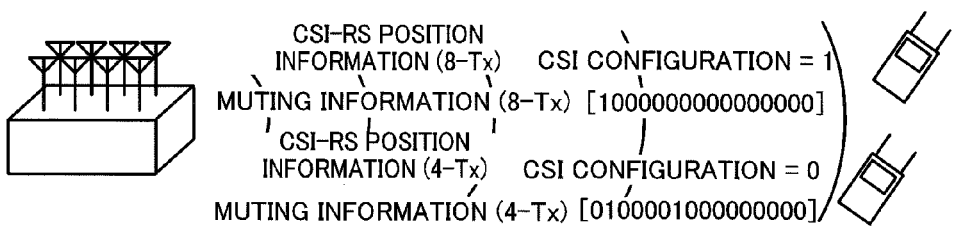

As shown in FIG. 6D, with the second reporting method, the base station apparatus concurrently reports CSI-RS position information to the 4-Tx and 8-Tx mobile terminal apparatus together, by the CSI-RS patterns for 4-Tx and 8-Tx. Also, the base station apparatus is able to report the muting information for 4-Tx and for 8-Tx together. In this case, the 8-Tx mobile terminal apparatus disregards the report for 4-Tx and acquires the position information of the CSI-RSs for 8-Tx, and muting information. Also, the 4-Tx mobile terminal apparatus disregards the report for 8-Tx and acquires the position information of the CSI-RSs for 4-Tx and muting information.

For example, the base station apparatus may concurrently report the resources where CSI-RSs are arranged to the 4-Tx and 8-Tx mobile terminal apparatuses, by CSI configuration information to represent CSI-RS patterns. The base station apparatus reports CSI configuration=1 (see FIG. 6A), which represents index #1, for the 8-Tx mobile terminal apparatus, and also reports CSI configuration=0 (FIG. 6B), which represents index #0, for the 4-Tx mobile terminal apparatus.

Also, the base station apparatus may concurrently report muting information to the 4-Tx and 8-Tx mobile terminal apparatus in the above-described bitmap format. In this case, the base station apparatus reports 16-bit bitmap information [1000000000000000] for the 8-Tx mobile terminal apparatus, and also reports 16-bit bitmap information [0100001000000000] for the 4-Tx mobile terminal apparatus. The 8-Tx muting information is disregarded in the 4-Tx mobile terminal apparatus, and the 4-Tx muting information is disregarded in the 8-Tx mobile terminal apparatus.

In this case, instead of the configuration to report muting information from the base station apparatus to the 4-Tx and 8-Tx mobile terminal apparatuses, it is equally possible to make the 4-Tx and 8-Tx mobile terminal apparatuses recognize the resource where CSI-RSs for other terminal apparatuses are allocated, as resources to be muted. In this case, setting may be provided in the 4-Tx and 8-Tx mobile terminal apparatus such that both reports for 4-Tx and 8-Tx can be received. By this means, it is possible to reduce the signaling amount of muting information.

Note that, in each configuration shown as an example above, the base station apparatus reports the transmission period (duty cycle), subframe offset and so on to the 4-Tx and 8-Tx mobile terminal apparatuses, in addition to the resources where CSI-RSs are arranged and muting resources. Also, these CSI-RS position information and so on may be reported by higher layer signaling or may be reported by a broadcast channel, a control channel, or a data channel.

Also, in the configurations shown above as examples, the first and second reporting methods are by no means limited to the above methods. For example, the base station apparatus may report CSI-RS position information to the 4-Tx and 8-Tx mobile terminal apparatuses in the bitmap format. Also, the base station apparatus may report muting information to the 4-Tx and 8-Tx mobile terminal apparatuses by CSI configuration information, which represents CSI-RS patterns. Also, UE specific reporting and concurrently reporting may be combined as well.

Also, the indices by which the CSI-RS patterns are numbered in FIG. 5 and FIG. 6 are only examples and may be changed as appropriate. Also, the 4-Tx and 8-Tx reports may be identified by each mobile terminal apparatus by identification bits and so on. Also, the 8-Tx mobile terminal apparatus is by no means limited to a new mobile terminal apparatus and has only to be a mobile terminal apparatus to support the MIMO transmission that is adopted in the base station apparatus. Also, the 4-Tx mobile terminal apparatus is by no means limited to an existing mobile terminal apparatus and has only to be a mobile terminal apparatus that does not support, or supports only on a selective basis, the MIMO transmission that is adopted in the base station apparatus.

Figure 7:
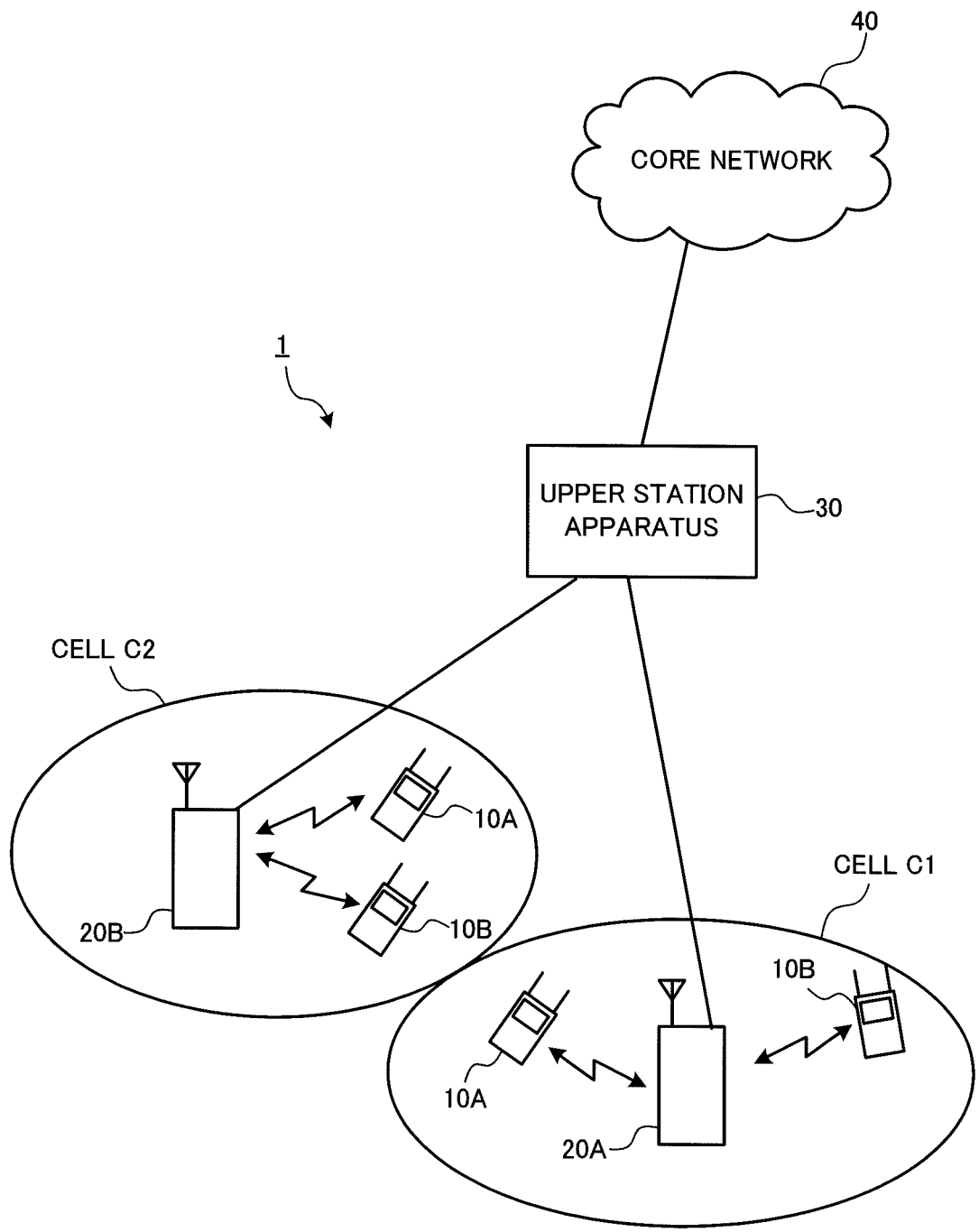
FIG. 7 is a diagram to explain a system configuration of a radio communication system.

Now, a radio communication system according to an embodiment of the present invention will be described in detail. FIG. 7 is a diagram to explain a system configuration of a radio communication system according to the present embodiment. Note that the radio communication system shown in FIG. 7 is a system to accommodate, for example, the LTE system or its successor system. In this radio communication system, carrier aggregation, which groups a plurality of fundamental frequency blocks into one, where the system band of the LTE system is one unit, is used. Also, this radio communication system may be referred to as IMT-Advanced or may be referred to as 4G.

As shown in FIG. 7, a radio communication system 1 is configured to include base station apparatuses 20A and 20B, and a plurality of 8-Tx and 4-Tx mobile terminal apparatuses 10A and 10B that communicate with these base station apparatuses 20A and 20B. The base station apparatuses 20A and 20B are connected with an upper station apparatus 30, and this upper station apparatus 30 is connected with a core network 40. Also, the base station apparatuses 20A and 20B are connected with each other by wired or by wireless. The mobile terminal apparatuses 10A and 10B are able to communicate with the base station apparatuses 20A and 20B in cells C1 and C2. Note that the upper station apparatus 30 includes, for example, an access gateway apparatus, a radio network controller (RNC), a mobility management entity (MME) and so on, but is by no means limited to these.

Although the mobile terminal apparatuses 10A and 10B include LTE terminals and LTE-A terminals, 4-Tx and 8-Tx mobile terminal apparatuses will be simply described below unless specified otherwise. Also, although the mobile terminal apparatuses 10A and 10B perform radio communication with the base station apparatuses 20A and 20B for ease of explanation, more generally, user apparatuses (UE: User Equipment) including mobile terminal apparatuses and fixed terminal apparatuses may be used as well.

In the radio communication system 1, although, as radio access schemes, OFDMA (Orthogonal Frequency Division Multiple Access) is applied to the downlink and SC-FDMA (Single-Carrier Frequency-Division Multiple Access) is applied to the uplink, the uplink radio access scheme is by no means limited to this. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Now, communication channels will be described. Downlink communication channels include a PDSCH (Physical Downlink Shared Channel) as a downlink data channel used by the mobile terminal apparatuses 10A and 10B on a shared basis, and downlink L1/L2 control channels (PDCCH, PCFICH, PHICH). User data and higher control information are sent by means of the PDSCH. PDSCH and PUSCH scheduling information and so on are sent by the PDCCH (Physical Downlink Control Channel). The number of OFDM symbols to use for the PDCCH is sent by the PCFICH (Physical Control Format Indicator Channel). HARQ ACK and NACK for the PUSCH are sent by the PHICH (Physical Hybrid-ARQ Indicator CHannel).

Uplink communication channels include a PUSCH (Physical Uplink Shared CHannel) that is an uplink data channel used by each mobile terminal apparatus on a shared basis, and a PUCCH (Physical Uplink Control CHannel), which is an uplink control channel. User data and higher control information are sent by the PUSCH. Also, by means of the PUCCH, downlink radio quality information (CQI: Channel Quality Indicator), ACK/NACK and so on are sent.

Figure 8:
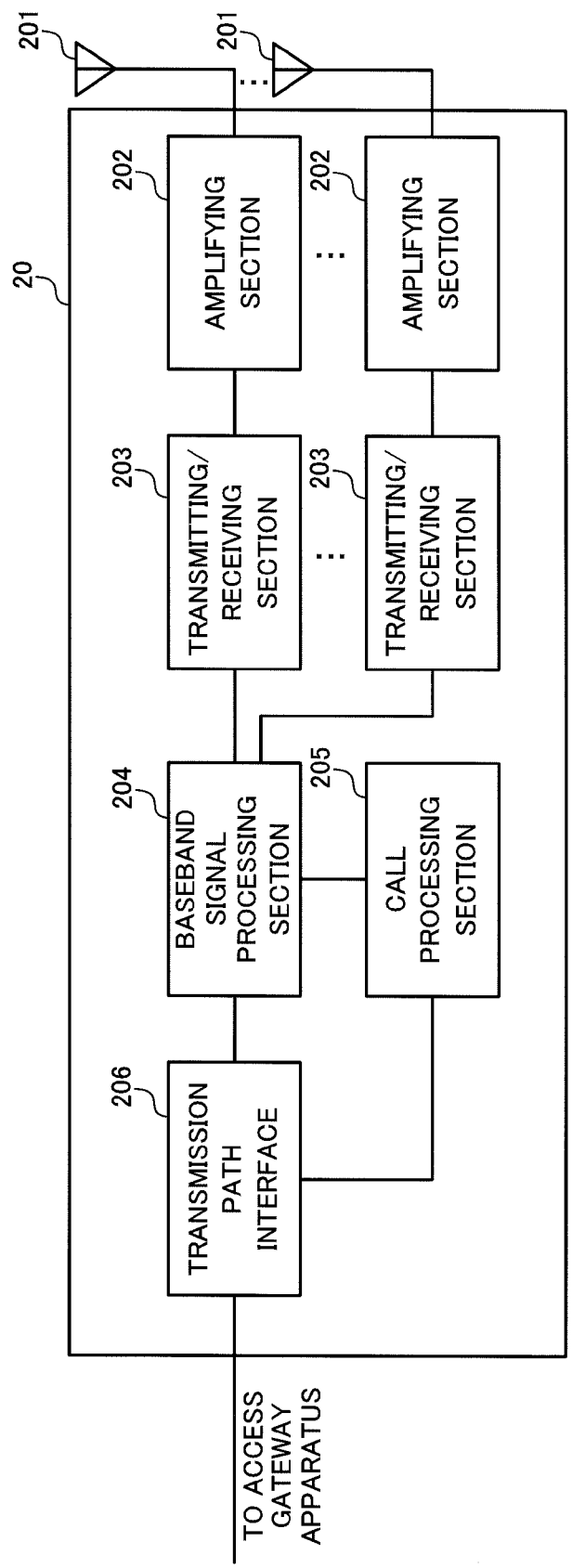
FIG. 8 is a diagram to explain an overall configuration of a base station apparatus.

Referring to FIG. 8, an overall configuration of the base station apparatus according to the present embodiment will be described. Note that the base station apparatuses 20A and 20B have the same configuration and therefore will be described as "base station apparatus 20." Also, the mobile terminal apparatuses 10A and 10B have the same configuration and will be described simply as "mobile terminal apparatus 10." The base station apparatus 20 has a plurality of transmitting/receiving antennas 201 for MIMO transmission, an amplifying section 202, a transmitting/receiving section (reporting section) 203, a baseband signal processing section 204, a call processing section 205, and a transmission path interface 206.

User data that is transmitted from the base station apparatus 20 to the mobile terminal apparatus 10 on the downlink is input from the higher station apparatus 30, in the baseband signal processing section 204, via the transmission path interface 206.

In the baseband signal processing section 204, a downlink data channel signal is subject to a PDCP layer process, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process, and the result is transferred to each transmitting/receiving section 203. Furthermore, signals of a downlink control channel are also subjected to transmission processes such as channel coding and inverse fast Fourier transform, and are transferred to each transmitting/receiving section 203.

Also, the baseband signal processing section 204 reports control information to allow communication in that cell, to the mobile terminal apparatuses 10, by a broadcast channel. The information for communication in the cell includes, for example, the uplink or downlink system bandwidth, resource block information assigned to the mobile terminal apparatus 10, precoding information for precoding in the mobile terminal apparatus 10, identification information of a root sequence (root sequence index) for generating random access preamble signals in the PRACH (Physical Random Access Channel), and so on. The precoding information may be sent via an independent control channel such as the PHICH.

The baseband signal that is subjected to precoding for each antenna and output from the baseband signal processing section 204 is converted into a radio frequency band in the transmitting/receiving section 203. The amplifying section 202 amplifies the radio frequency signal subjected to frequency conversion, and outputs the result to the transmitting/receiving antenna 201.

Meanwhile, as for data to be transmitted on the uplink from the mobile terminal apparatus 10 to the base station apparatus 20, a radio frequency signal that is received in each transmitting/receiving antenna 201 is amplified in the amplifying section 202, subjected to frequency conversion and converted into a baseband signal in each transmitting/receiving section 203, and is input in the baseband signal processing section 204.

The baseband signal processing section 204 performs an FFT process, an IDFT process, error correction decoding, a MAC retransmission control receiving process, and RLC layer and PDCP layer receiving processes, of the user data that is included in the received baseband signal, and the result is transferred to the upper station apparatus 30 through the transmission path interface 206.

The call processing section 205 performs call processing such as setting up and releasing communication channels, manages the state of the base station apparatus 20 and manages the radio resources.

Figure 9:
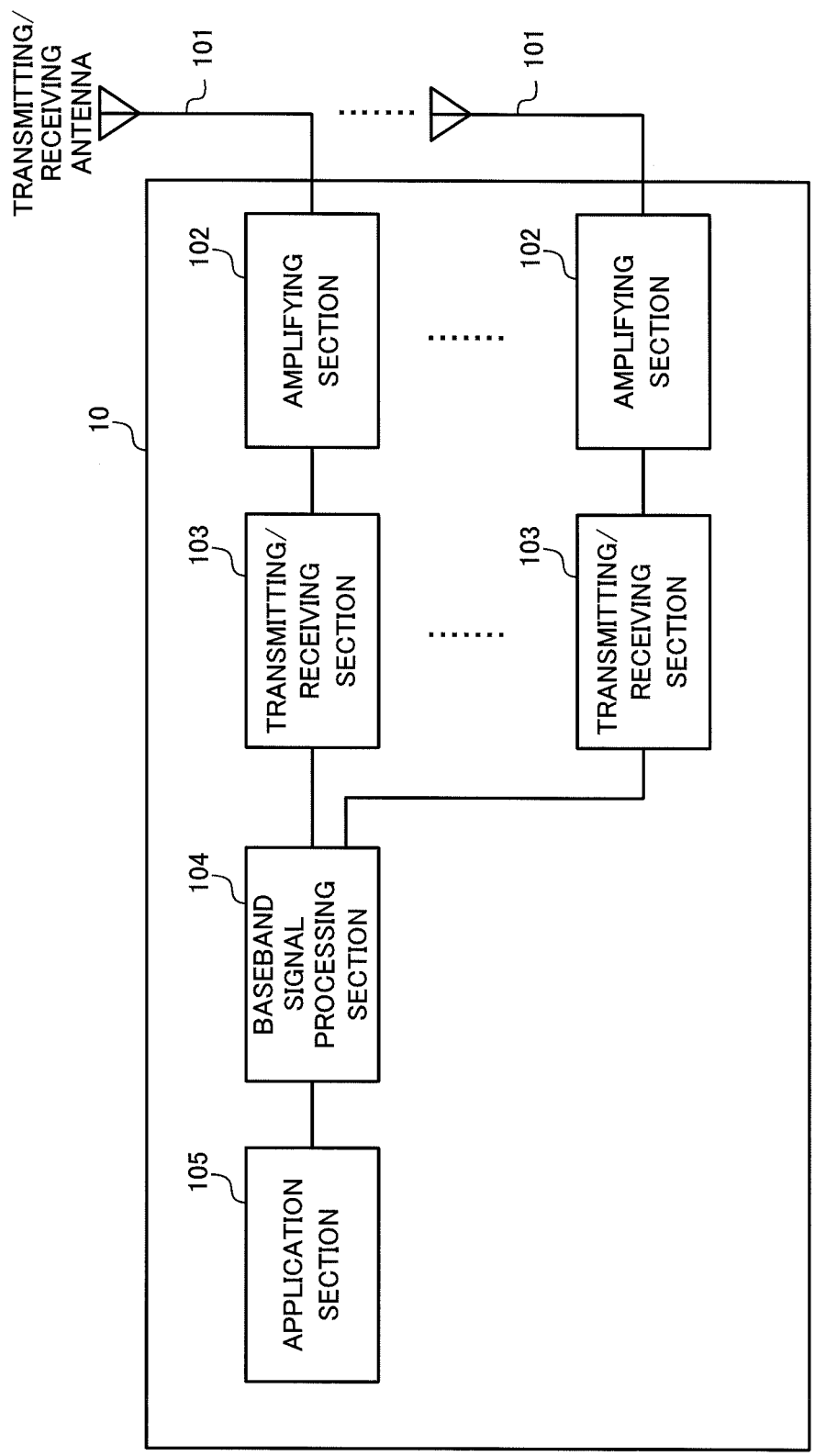
FIG. 9 is a diagram to explain an overall configuration of a mobile terminal apparatus.

Next, referring to FIG. 9, an overall configuration of a mobile terminal apparatus according to the present embodiment will be described. An LTE terminal and an LTE-A terminal have the same hardware configurations in principle parts, and therefore will be described indiscriminately. The mobile terminal apparatus 10 has a plurality of transmitting/receiving antenna 101 for MIMO transmission, an amplifying section 102, a transmitting/receiving section 103, a baseband signal processing section 104 and an application section 105.

As for downlink data, radio frequency signals that are received in the plurality of transmitting/receiving antenna 101 are each amplified in the amplifying section 102, and subjected to frequency conversion and converted into a baseband signal in the transmitting/receiving section 103. This baseband signal is subjected to receiving processes such as an FFT process, error correction decoding and retransmission control, in the baseband signal processing section 104. In this downlink data, downlink user data is transferred to the application section 105. The application section 105 performs processes related to upper layers above the physical layer and the MAC layer. Also, in the downlink data, broadcast information is also transferred to the application section 105.

Meanwhile, uplink user data is input from the application section 105 to the baseband signal processing section 104. The baseband signal processing section 104 performs a retransmission control (HARQ (Hybrid ARQ)) transmission process, channel coding, a DFT process, an IFFT process, and so on, and the result is transferred to each transmitting/receiving section 103. The baseband signal that is output from the baseband signal processing section 104 is converted into a radio frequency band in the transmitting/receiving section 103. After that, the amplifying section 102 amplifies the radio frequency signal having been subjected to the frequency conversion, and transmits the result from the transmitting/receiving antenna 101.

Figure 10:
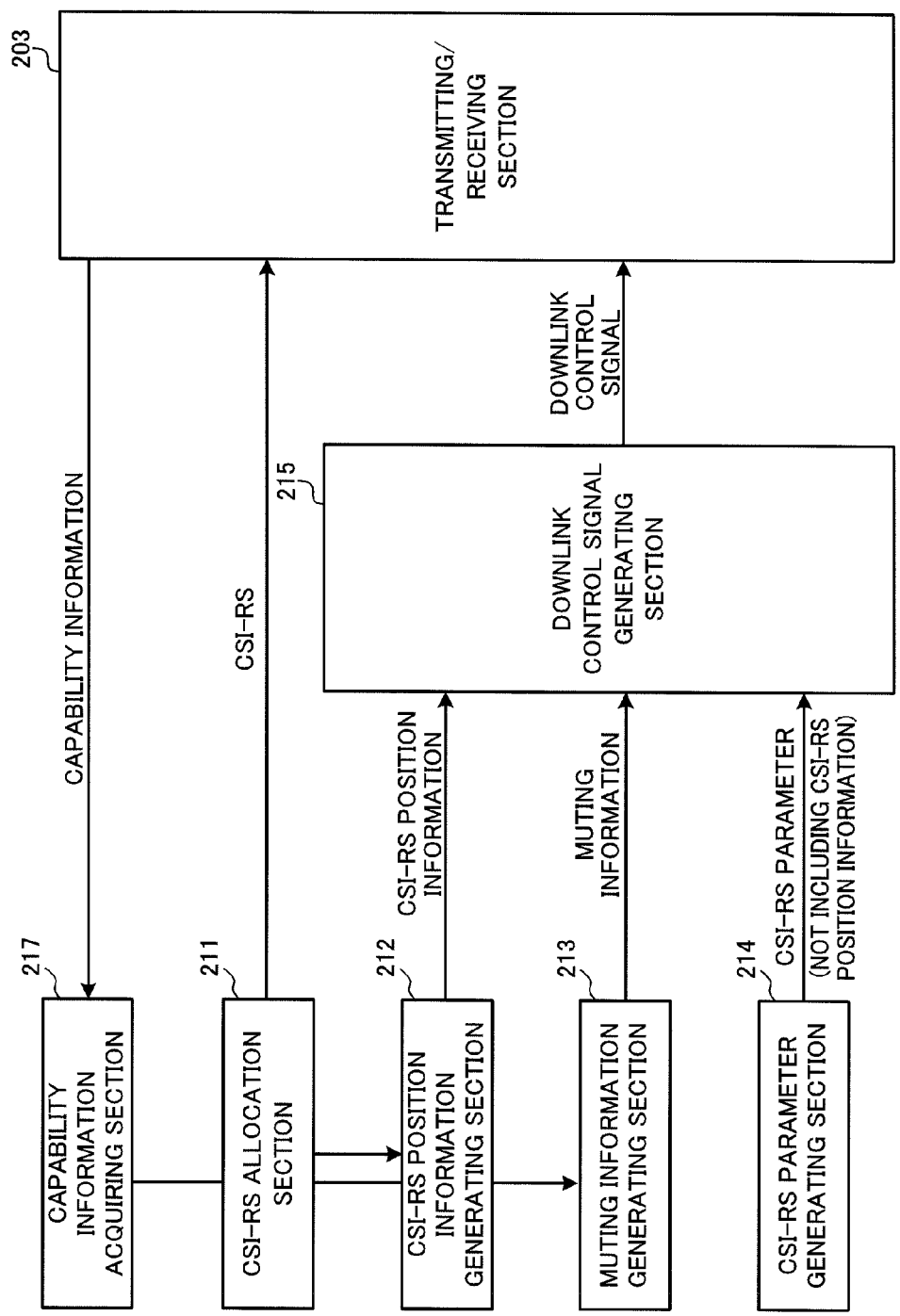
FIG. 10 is a functional block diagram the first reporting method by a base station apparatus.

The function blocks of a base station apparatus to support the first reporting method will be described with reference to FIG. 10. Note that the function blocks of FIG. 10 are primarily shown by simplifying the processing content of the baseband signal processing section, and are assumed to have the configurations which a baseband processing section normally has. Also, the following description will be given primarily in association with the CSI-RS allocation configuration shown in FIG. 5.

According to the first reporting method shown in FIG. 10, the base station apparatus 20 has a CSI-RS allocation section 211, a CSI-RS position information generating section 212, a muting information generating section 213, a CSI-RS parameter generating section 214, a downlink control signal generating section 215, a performance information acquiring section 217 and a transmitting/receiving section 203. The capability information acquiring section 217 acquires capability information by signaling (UE capability) from the mobile terminal apparatuses 10A and 10B. The capability information is, for example, MIMO transmission which the mobile terminal apparatuses 10A and 10B can support, the number of antennas which can be supported, and so on.

The CSI-RS allocation section 211 allocates CSI-RSs to CSI-RS resources for 8-Tx. By this means, CSI-RSs are not only allocated to the 8-Tx mobile terminal apparatus 10A but are also allocated to the 4-Tx mobile terminal apparatus 10B as well. Note that the CSI-RS allocation section 211 may allocate CSI-RSs to different resources between the mobile terminal apparatuses 10A and 10B supporting different MIMO transmissions.

The CSI-RS position information generating section 212 generates position information of the CSI-RSs allocated by the CSI-RS allocation section 211. The CSI-RS position information includes the transmission period (duty cycle), subframe offset and so on, in addition to the resources where CSI-RSs are allocated. The resources where CSI-RSs are allocated are specified by CSI configurations, bitmap information and so on. CSI-RS position information is generated on a per mobile terminal apparatus basis and is input in the downlink control signal generating section 215 as one of the CSI-RS parameters.

The muting information generating section 213 generates muting information, which allows the mobile terminal apparatuses to recognize the resources where unnecessary CSI-RSs are allocated, as resources to be muted. The resources shown in this muting information are in fact allocated CSI-RSs, and are not muted. For the muting information, bitmap information, CSI configurations and so on are generated. The muting information is generated on per mobile terminal apparatus basis, individually, based on capability information acquired in the capability information acquiring section 217, and input in the downlink control signal generating section 215.

The CSI-RS parameter generating section 214 generates parameters other than CSI-RS position information, such as the sequence and transmission power of CSI-RSs. The CSI-RS parameters generated in the CSI-RS parameter generating section 214 are input in the downlink control signal generating section 215.

With respect to each of the mobile terminal apparatuses 10A and 10B, the downlink control signal generating section 215 generates downlink control signals including CSI-RS position information, CSI-RS parameters and muting information. By this means, all the resources where CSI-RSs are allocated are reported to the 8-Tx mobile terminal apparatus 10A, individually, by CSI-RS position information for 8-Tx. Also, to the 4-Tx mobile terminal apparatus 10B, part of the CSI-RS resources is reported by the CSI-RS position information for 4-Tx, and the rest of the CSI-RSs are reported by muting information, individually. The transmitting/receiving section 203 transmits the CSI-RSs and downlink control signals to the mobile terminal apparatuses 10A and 10B.

The function blocks of the 4-Tx and 8-Tx mobile terminal apparatuses to support the first reporting method will be described with reference to FIG. 11. Note that the function blocks of FIG. 11 are primarily shown by simplifying the processing content of the baseband signal processing section, and are assumed to have the configurations which a baseband processing section normally has.

Figure 11:
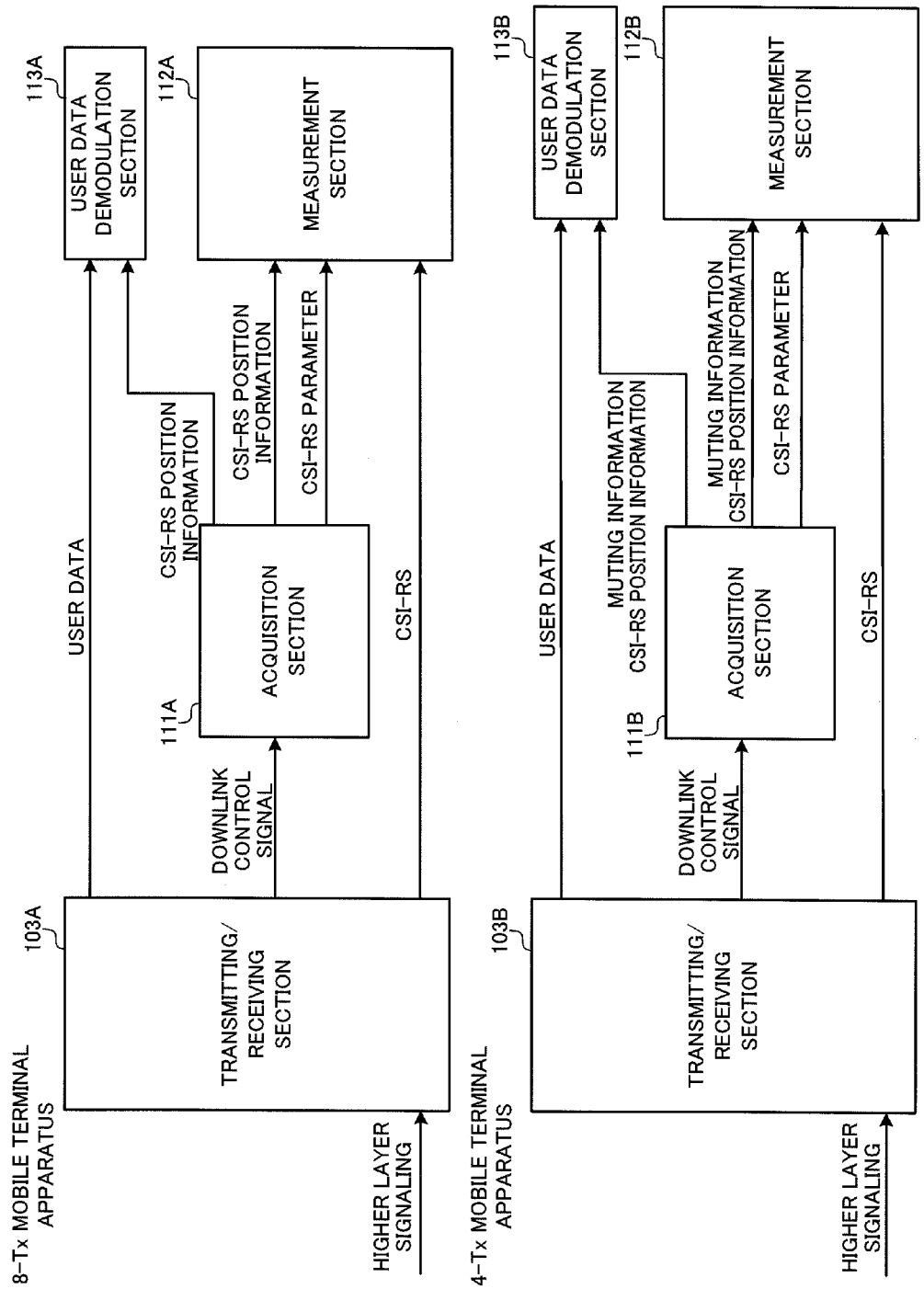
FIG. 11 is a functional block diagram to support the first reporting method by 4-Tx and 8-Tx mobile terminal apparatuses.

As shown in FIG. 11, the 8-Tx mobile terminal apparatus 10A has a transmitting/receiving section 103A, an acquisition section 111A, a measurement section 112A, and a user data demodulation section 113A. The transmitting/receiving section 103A receives CSI-RSs and downlink control signal from the base station apparatus 20. The acquisition section 111A demodulates the downlink control signal and analyzes the content of the signal, and, by this means, acquires CSI-RS position information and CSI-RS parameters. Note that, when the downlink control signal includes muting information, the acquisition section 111A is able to acquire the muting information as well.

The measurement section 112A measures CSI from parameters such as CSI-RS position information, sequence, transmission power and so on. The user data demodulation section 113 demodulates the user data received via the transmitting/receiving section 103. Note that the 8-Tx mobile terminal apparatus 10A may be configured to receive the CSI-RS position information and CSI-RS parameters by higher layer signaling. Also, when the downlink control signals includes muting information, the user data demodulation section 113A disregards the resources shown in the muting information, with the resources shown in the CSI-RS position information, and demodulates the user data.

Also, the 4-Tx mobile terminal apparatus 10B has a transmitting/receiving section 103B, an acquisition section 111B, a measurement section 112B and a user data demodulation section 113B. The transmitting/receiving section 103B receives CSI-RSs and downlink control signal from the base station apparatus 20. The acquisition section 111B demodulates the downlink control signal and analyzes the content of the signal, and, by this means, acquires CSI-RS position information, CSI-RS parameters and muting information.

The measurement section 112B measures CSI from parameters such as CSI-RS position information, sequence, transmission power and so on. The user data demodulation section 113B demodulates the user data received via the transmitting/receiving section 103B. In this case, the user data demodulation section 113B recognizes the resources where unnecessary CSI-RSs are allocated as resources to be muted, based on the muting information reported from the base station apparatus 20. Consequently, the user data demodulation section 113B does not demodulate the resources where CSI-RSs are allocated and the resources that are muted, that is, performs rate matching, so that the throughput of the demodulation process and the accuracy of demodulation are improved. Note that the second mobile terminal apparatus 10B may be configured to receive CSI-RS position information, CSI-RS parameters and muting information, by higher layer signaling.

Figure 12:
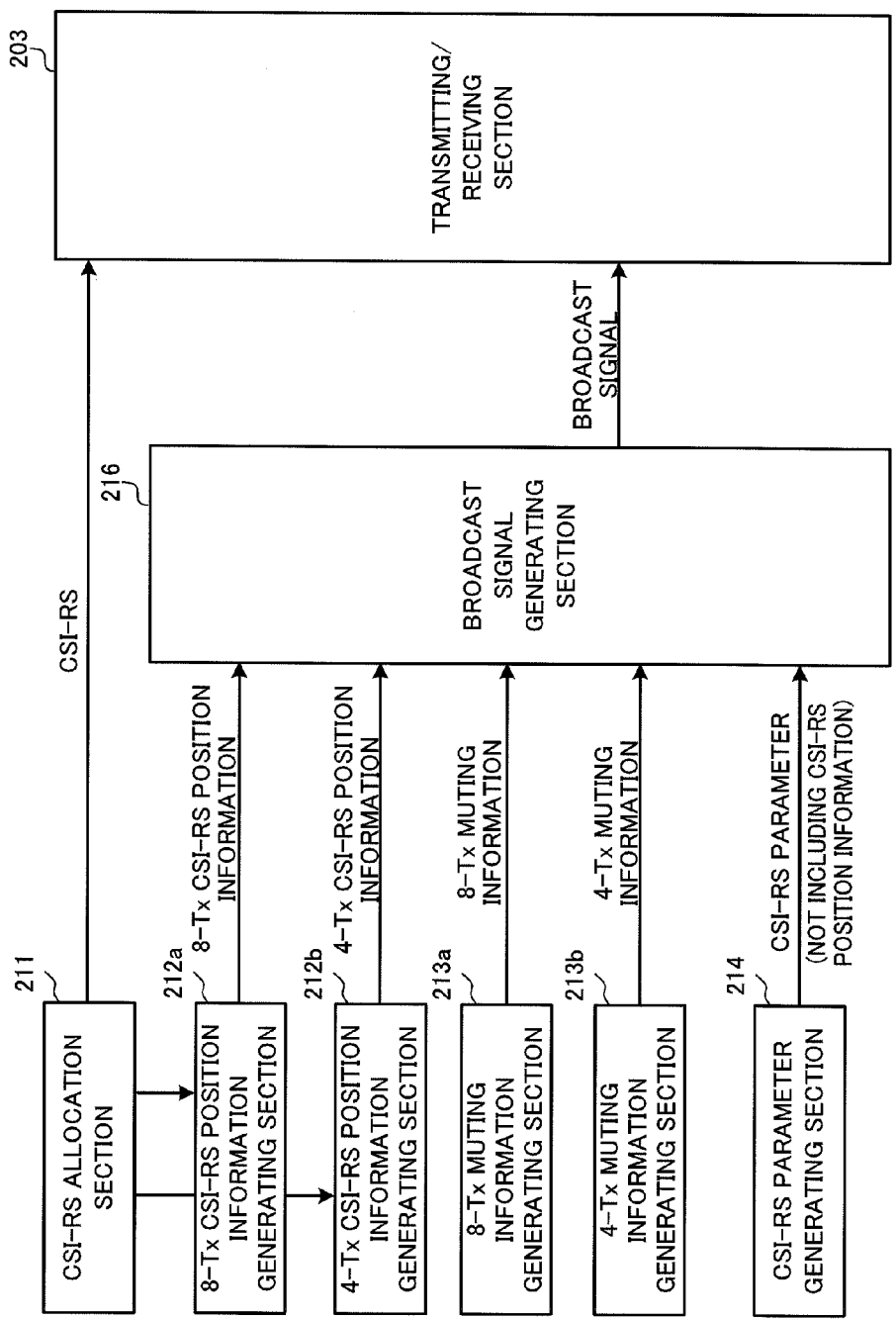
FIG. 12 is a functional block diagram corresponding to a second reporting method by a base station apparatus.

The function blocks of the base station apparatus to support the second reporting method will be described with reference to FIG. 12. Note that the function blocks of FIG. 12 are primarily shown by simplifying the processing content of the baseband signal processing section, and are assumed to have the configurations which a baseband processing section normally has. Also, the blocks in FIG. 12 that are the same as in FIG. 10 will be assigned the same codes as in FIG. 10 and will be described accordingly. Also, the following description will be given primarily in association with the CSI-RS allocation configuration shown in FIG. 5.

According to the second reporting method shown in FIG. 12, the base station apparatus 20 has a CSI-RS allocation section 211, an 8-Tx CSI-RS position information generating section 212a, a 4-Tx CSI-RS position information generating section 212b, an 8-Tx muting information generating section 213a, a 4-Tx muting information generating section 213b, a CSI-RS parameter generating section 214, a broadcast signal generating section 216, and a transmitting/receiving section 203. Note that the present embodiment may also be configured to provide a capability information acquisition section, acquire capability information of the mobile terminal apparatuses and make reporting variable.

The CSI-RS allocation section 211 allocates CSI-RSs to CSI-RS resources for 8-Tx. By this means, CSI-RSs are not only allocated to the 8-Tx mobile terminal apparatus 10A but are also allocated to the 4-Tx mobile terminal apparatus 10B as well. Note that the CSI-RS allocation section 211 may allocate CSI-RSs to different resources between the mobile terminal apparatuses 10A and 10B supporting different MIMO transmissions.

The CSI-RS position information generating section 212a generates position information of the CSI-RSs for 8-Tx allocated by the CSI-RS allocation section 211 for the 8-Tx mobile terminal apparatus 10A. The CSI-RS position information generating section 212b generates position information of the CSI-RSs for 4-Tx allocated by the CSI-RS allocation section 211 for the 4-Tx mobile terminal apparatus 10B. The CSI-RS position information includes the transmission period (duty cycle), subframe offset and so on, in addition to the resources where the CSI-RSs are allocated. The resources where CSI-RSs are allocated are specified by CSI configurations, bitmap information and so on. The position information of the CSI-RSs is input in the broadcast signal generating section 216, as one of the CSI-RS parameters.

The muting information generating section 213 generates 8-Tx muting information, which allows the 8-Tx mobile terminal apparatus 10A to recognize the resources where unnecessary resources are allocated, as resources to be muted. The muting information generating section 213b generates 4-Tx muting information, which allows the 4-Tx mobile terminal apparatus 10B to recognize the resources where unnecessary CSI-RSs are allocated, as resources to be muted. The resources shown in these muting information are in fact allocated CSI-RSs, and are not muted. For the muting information, bitmap information, CSI configurations and so on are generated. The muting information is input in the downlink control signal generating section 215.

The CSI-RS parameter generating section 214 generates parameters other than CSI-RS position information, such as CSI-RS sequence, transmission power and so on. The CSI-RS parameters generated in the CSI-RS parameter generating section 214 are input in the broadcast signal generating section 216.

The broadcast signal generating section 216 generates a broadcast signal including the position information of the CSI-RSs for 4-Tx and for 8-Tx, CSI-RS parameters, and the muting information for 4-Tx and 8-Tx. By this means, to the 8-Tx mobile terminal apparatus 10A and 4-Tx mobile terminal apparatus 10B, the position information of the CSI-RSs for 4-Tx and 8-Tx, CSI-RS parameters and the muting information for 4-Tx and 8-Tx are broadcast together. The transmitting/receiving section 203 transmits CSI-RSs and broadcast signal to each of the mobile terminal apparatuses 10A and 10B.

Figure 13:
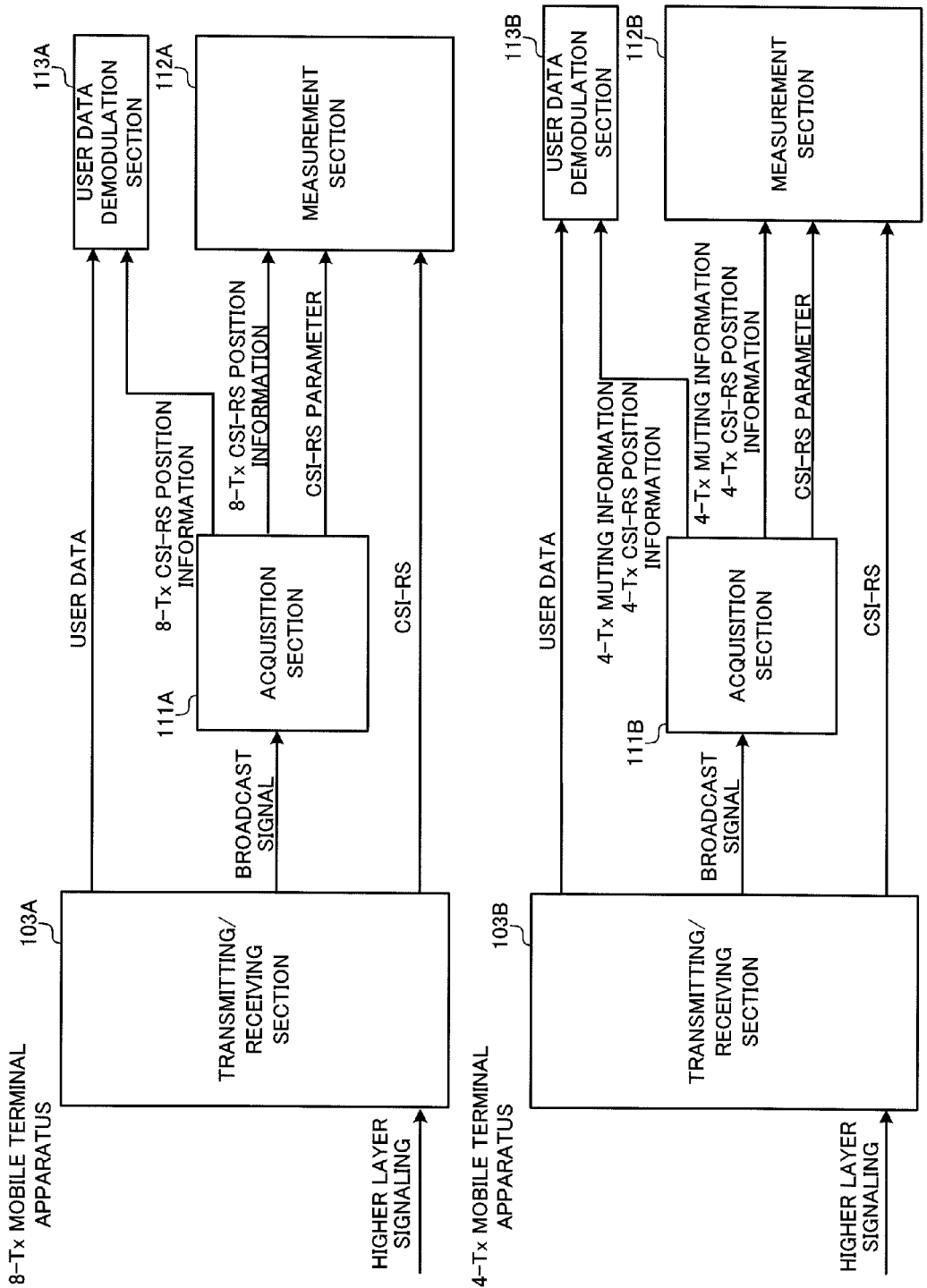
FIG. 13 is a functional block diagram to support the second reporting method by 4-Tx and 8-Tx mobile terminal apparatuses.

The function blocks of 4-Tx and 8-Tx mobile terminal apparatuses to support the second reporting method will be described with reference to FIG. 13. Note that the function blocks of FIG. 13 are primarily shown by simplifying the processing content of the baseband signal processing section, and are assumed to have the configurations which a baseband processing section normally has. Also, the blocks in FIG. 13 that are the same as in FIG. 11 will be assigned the same codes as in FIG. 11 and will be described accordingly.

As shown in FIG. 13, the 8-Tx mobile terminal apparatus 10A has a transmitting/receiving section 103A, an acquisition section 111A, a measurement section 112A, and a user data demodulation section 113A. The transmitting/receiving section 103A receives CSI-RSs and broadcast signal from the base station apparatus 20. The acquisition section 111A demodulates the broadcast signal and analyzes the content of the signal, and, by this means, disregards the CSI-RS position information report for 4-Tx, and acquires the position information of the CSI-RSs for 8-Tx and CSI-RS parameters. Note that, when the broadcast signal includes muting information for 8-Tx, the acquisition section 111A is able to acquire the muting information as well.

The measurement section 112A measures CSI based on parameters such as CSI-RS position information, sequence, transmission power and so on. The user data demodulation section 113A demodulates the user data received via the transmitting/receiving section 103A. Note that the 8-Tx mobile terminal apparatus 10A may be configured to receive the CSI-RS position information and CSI-RS parameters by higher layer signaling. Also, when the broadcast signal includes muting information, the user data demodulation section 113A disregards the resources shown in the muting information, with the resources shown in the CSI-RS position information, and demodulates the user data.

Also, the 4-Tx mobile terminal apparatus 10B has a transmitting/receiving section 103B, an acquisition section 111B, a measurement section 112B, and a user data demodulation section 113B. The transmitting/receiving section 103A receives CSI-RSs and broadcast signal from the base station apparatus 20. The acquisition section 111B demodulates the broadcast signal and analyzes the content of the signal, and, by this means, disregards the CSI-RS position information report for 8-Tx, and acquires the position information of the CSI-RSs for 4-Tx, CSI-RS parameters and muting information.

The measurement section 112B measures CSI based on parameters such as CSI-RS position information, sequence, transmission power and so on. The user data demodulation section 113A demodulates the user data received via the transmitting/receiving section 103B. In this case, the user data demodulation section 113B recognizes the resources where additional CSI-RSs are allocated as resources to be muted, based on the muting information reported from the base station apparatus 20. Consequently, the user data demodulation section 113B does not demodulate the resources where CSI-RSs are allocated and the resources that are muted, that is, performs rate matching, so that the throughput of the demodulation process and the accuracy of demodulation are improved. Note that the 4-Tx mobile terminal apparatus 10B may be configured to receive CSI-RS position information, CSI-RS parameters and muting information, by higher layer signaling.

As described above, with the base station apparatus 20 according to the present embodiment, even upon upgrading from 4-Tx MIMO transmission to 8-Tx MIMO transmission, it is possible to allow the 8-Tx mobile terminal apparatus 10A and 4-Tx mobile terminal apparatus 10B to receive CSI-RSs. Also among the CSI-RSs reported from the base station apparatus 20, the 4-Tx mobile terminal apparatus 10 is able to disregard the CSI-RSs that are shown in muting information, and measure the channel state. Consequently, the 4-Tx mobile terminal apparatus 10B is able to receive CSI-RSs without being influenced by the upgrading of the base station apparatus 20.

Note that, although the first and second reporting methods have been described with the above-described embodiment, the method of reporting CSI-RS position information is by no means limited to this. The method of reporting CSI-RS position information has only to be a method that reports at least resources where CSI-RSs are allocated to an 8-Tx mobile terminal apparatus, and that, upon reporting the resources where CSI-RSs are allocated to a 4-Tx mobile terminal apparatus, reports part of the resources as resources to be muted.

Also, although the above-described embodiment is configured such that, in a mobile terminal apparatus, an acquisition section acquires CSI-RS position information, muting information and CSI-RS parameters, this configuration is by no means limiting. Such configurations are equally possible, in which CSI-RS position information, muting information, and CSI-RS parameters are acquired by function blocks other than an acquisition section, such as, for example, a measurement section a user data demodulation section, and so on.

Also, although the above embodiment has shown the CSI-RS as an example of a reference signal, this is by no means limiting. The reference signal has only to be used to measure the channel state. Also, CSI has only to include at least one of CQI, PMI, and RI.

The present invention is by no means limited to the above embodiment and can be implemented in various modifications. For example, without departing from the scope of the present invention, it is possible to adequately change, in the above description, the positions to set CSI-RSs, the positions to set muting, the number of processing sections, the order of steps, the number of CSI-RSs, the count of muting, and the number of antennas, and implement these. Besides, the present invention can be implemented with various changes, without departing from the scope of the present invention.

The disclosure of Japanese Patent Application No. 2011-028534, filed on Feb. 14, 2011, including the specification, drawings and abstract, is incorporated herein by reference in its entirety.

The invention claimed is:

1. A base station apparatus that is able to support up to a maximum number of transmission ports for CSI-RS (Channel State Information Reference Signal), which is a reference signal for channel measurement, and communicates with a plurality of mobile terminal apparatuses which are able to support different maximum numbers of transmission ports for CSI-RS, the base station apparatus comprising:
    an allocation section that allocates CSI-RSs to resource elements specified by a CSI-RS pattern associated with any number of transmission ports, the CSI-RS pattern indicating allocation of the CSI-RSs in a resource block and being defined in association with each of numbers of transmission ports from a minimum number up to the maximum number of transmission ports;
    a position information generating section that generates CSI-RS position information to specify resources to which the CSI-RSs are allocated;
    a muting information generating section that generates muting information indicating that, of the CSI-RSs allocated to the resource elements by the allocation section, CSI-RSs that are not supported by a mobile terminal apparatus as a communication target are subjected to muting of transmission power for resource elements; and
    a transmission section that transmits the CSI-RSs allocated to the resource elements by the allocation section, the muting information and the CSI-RS position information.

2. A mobile terminal apparatus in a mobile communication system having a base station apparatus and a plurality of mobile terminal apparatuses, the base station apparatus being able to support up to a maximum number of transmission ports for CSI-RS (Channel State Information Reference Signal), which is a reference signal for channel measurement and the mobile terminal apparatuses being able to support different maximum numbers of transmission ports for CSI-RS,
    wherein
    a maximum number of supportable transmission ports of the mobile terminal apparatus is smaller than the maximum number of transmission ports of the base station apparatus, and,
    the mobile terminal apparatus comprises comprising:
    a receiving section that receives CSI-RSs allocated to resource elements specified by a CSI-RS pattern associated with any number of transmission ports, the CSI-RS pattern indicating allocation of the CSI-RSs in a resource block and being defined in association with each of numbers of transmission ports from a minimum number up to the maximum number of transmission ports, CSI-RS position information to specify resources to which the CSI-RSs are allocated, and muting information indicating that, of the CSI-RSs allocated to the resource elements by the base station apparatus, CSI-RSs that are not supported by the mobile terminal apparatus are subjected to muting of transmission power for resource elements; and
    a measuring section that recognizes that the transmission power for the resource elements allocated with unsupported CSI-RSs is muted based on the muting information and monitor resource elements allocated with supported CSI-RSs for downlink channel measurement.

3. A communication control method in a mobile communication system having: a base station apparatus that is able to support up to a maximum number of transmission ports for CSI-RS (Channel State Information Reference Signal) which is a reference signal for channel measurement; and a plurality of mobile terminal apparatuses that are able to support different maximum numbers of transmission ports for CSI-RS, the communication control method comprising the steps of:

in the base station apparatus, allocating CSI-RSs to resource elements specified by a CSI-RS pattern associated with any number of transmission ports, the CSI-RS pattern indicating allocation of the CSI-RSs in a resource block and being defined in association with each of numbers of transmission ports from a minimum number up to the maximum number of transmission ports;

generating CSI-RS position information to specify resources to which the CSI-RSs are allocated;

generating muting information indicating that, of the CSI-RSs allocated to the resource elements by the base station apparatus, CSI-RSs that are not supported by a mobile terminal apparatus as a communication target are subjected to muting of transmission power for resource elements; and transmitting the CSI-RSs allocated to the resource elements, the muting information and the CSI-RS position information; and in the mobile terminal apparatus, recognizing that the transmission power for the resource elements allocated with unsupported CSI-RSs is muted based on the muting information; and monitoring resource elements allocated with supported CSI-RSs for downlink channel measurement.

4. A mobile communication system comprising:

a base station apparatus that is able to support up to a maximum number of transmission ports for CSI-RS (Channel State Information Reference Signal) which is a reference signal for channel measurement; and a plurality of mobile terminal apparatuses that are able to support different maximum numbers of transmission ports for CSI-RS, wherein the base station apparatus has:

an allocation section configured to allocate CSI-RSs to resource elements specified by a CSI-RS pattern associated with any number of transmission ports, the CSI-RS pattern indicating allocation of the CSI-RSs in a resource block and being defined in association with each of numbers of transmission ports from a minimum number up to the maximum number of transmission ports;

a position information generating section configured to generate CSI-RS position information to specify resources to which the CSI-RSs are allocated;

a muting information generating section configured to generate muting information indicating that, of the CSI-RSs allocated to the resource elements by the allocation section, CSI-RSs that are not supported by a mobile terminal apparatus as a communication target are subjected to muting of transmission power for resource elements; and a transmission section configured to transmit the CSI-RSs allocated to the resource elements by the allocation section, the muting information and the CSI-RS position information, the mobile teiminal apparatus recognizes that the transmission power for the resource elements allocated with unsupported CSI-RSs is muted based on the muting information and monitors resource elements allocated with supported CSI-RSs for downlink channel measurement.

5. The mobile communication system according to claim 4, wherein, when the mobile terminal apparatus as the communication target is applied with a CSI-RS pattern associated with a larger number of transmission ports than a maximum number of transmission ports supported by the mobile terminal apparatus, the muting information generating section generates the muting information indicating that transmission power for resource elements allocated with CSI-RSs other than specified in a supported CSI-RS pattern is muted.

* * * * *